(12) United States Patent
Lee et al.

(10) Patent No.: US 11,803,283 B2
(45) Date of Patent: Oct. 31, 2023

(54) TOUCH DISPLAY DEVICE

(71) Applicant: LG Display Co., Ltd., Seoul (KR)

(72) Inventors: Yangsik Lee, Paju-si (KR); HwiDeuk Lee, Paju-si (KR); Sungsu Han, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/964,228

(22) Filed: Oct. 12, 2022

(65) Prior Publication Data

US 2023/0031502 A1 Feb. 2, 2023

Related U.S. Application Data

(63) Continuation of application No. 17/306,447, filed on May 3, 2021, now Pat. No. 11,500,501.

(30) Foreign Application Priority Data

Jul. 6, 2020 (KR) .......................... 10-2020-0082844

(51) Int. Cl.
   *G06F 3/044* (2006.01)
   *G06F 3/041* (2006.01)
(52) U.S. Cl.
   CPC .......... *G06F 3/0446* (2019.05); *G06F 3/0412* (2013.01); *G06F 3/0445* (2019.05); *G06F 2203/04107* (2013.01)
(58) Field of Classification Search
   CPC ........ G06F 3/041; G06F 3/044; G06F 3/0446; G06F 3/0412; G06F 3/0448; G06F 3/0445; G06F 3/04164; G06F 2203/04112; G06F 2203/04107
   See application file for complete search history.

(56) References Cited

U.S. PATENT DOCUMENTS

| | | | |
|---|---|---|---|
| 2011/0227858 A1* | 9/2011 | An | G06F 3/0317 345/173 |
| 2015/0277635 A1 | 10/2015 | Kim et al. | |
| 2018/0032193 A1 | 2/2018 | Qu | |
| 2019/0265820 A1* | 8/2019 | Li | H01L 24/42 |
| 2021/0335895 A1* | 10/2021 | Feng | G06F 3/0412 |

OTHER PUBLICATIONS

United States Office Action, U.S. Appl. No. 17/306,447, dated Apr. 7, 2022, 14 pages.

* cited by examiner

*Primary Examiner* — Deeprose Subedi
(74) *Attorney, Agent, or Firm* — Fenwick & West LLP

(57) ABSTRACT

Embodiments of the present disclosure are related to a touch display device, as a portion of a touch routing line is disposed on an area surrounded by a touch electrode line on an active area and is electrically connected to the touch electrode line, the touch routing line can be disposed on the active area while reducing an influence of a noise. Thus, as an additional arrangement of the touch routing line and a free adjustment of a connecting point of the touch routing line become possible without an increase of an area for arranging the touch routing line, a load by the touch routing line and a difference of a sensitivity according to positions of the touch electrode line are reduced and a performance of a touch sensing can be improved.

18 Claims, 32 Drawing Sheets

TOUCH DISPLAY DEVICE

CROSS REFERENCE TO RELATED APPLICATION

This application is a continuation of U.S. patent application Ser. No. 17/306,447, filed May 3, 2021, which claims priority from Republic of Korea Patent Application No. 10-2020-0082844, filed on Jul. 6, 2020, each of which are hereby incorporated by reference in their entirety.

BACKGROUND

Field

Embodiments of the present disclosure are related to a touch display device.

Description of Related Art

The growth of the information society leads to increased demand for display devices to display images and use of various types of display devices, such as liquid crystal display devices, organic light emitting display devices, etc.

The display devices, for providing more functions to a user, provide a function that recognizes a touch by a finger or a pen of the user being contacted to a display panel and performs an input process based on a recognized touch.

The display devices can comprise a plurality of touch electrodes disposed on the display panel, or embedded in the display panel. The display devices can sense a touch of the user to the display panel by detecting a change of a capacitance occurred by the touch of the user.

The touch electrode can be electrically connected to a touch driving circuit by a touch routing line disposed on the display panel. The touch electrode can be supplied a touch driving signal through the touch routing line, and the touch driving circuit can detect a touch sensing signal through the touch routing line.

Accordingly, there is a problem that a performance of a touch sensing can be reduced due to a reduction of a performance for detecting the touch sensing signal as a load by the touch routing line increases. Furthermore, there is a problem that a uniformity of the touch sensing can be reduced due to a difference of the load according to a length of the touch routing line or a point where the touch routing line is connected to the touch electrode.

SUMMARY

Embodiments of the present disclosure can provide methods that a load by a touch routing line can be reduced while reducing an increase of an area required for arranging the touch routing line.

Embodiments of the present disclosure can provide methods being capable of reducing a difference of touch sensing sensitivity according to a length of the touch routing line or a point where the touch routing line is connected to a touch electrode.

In an aspect, embodiments of the present disclosure can provide a touch display device comprising, a plurality of X-touch electrode lines comprising two or more X-touch electrodes disposed on an active area on an encapsulation layer and at least some of the two or more X-touch electrodes are electrically connected to each other along a first direction, a plurality of Y-touch electrode lines comprising two or more Y-touch electrodes disposed on the active area on the encapsulation layer and at least some of the two or more Y-touch electrodes are electrically connected to each other along a second direction crossing the first direction, and a plurality of touch routing lines, at least a portion of the touch routing line is located on the encapsulation layer, and each of the plurality of touch routing lines is electrically connected to one of the plurality of X-touch electrode lines and the plurality of Y-touch electrode lines.

At least one of the plurality of X-touch electrode lines and the plurality of Y-touch electrode lines included in the touch display device can be electrically connected to two or more touch routing lines of the plurality of touch routing lines.

At least one of the two or more touch routing lines can comprise a first part disposed on a non-active area located outside the active area, and a second part connected to the first part, at least a portion of the second part is disposed on the active area, and the second part is electrically connected to the touch electrode line.

Here, at least a portion of the second part is located on an area surrounded by the touch electrode line electrically connected to the second part.

Alternatively, at least a portion of the second part is located on an area surrounded by a touch electrode line which is supplied a same signal as a signal supplied to the touch electrode line electrically connected to the second part and is insulated from the second part.

In another aspect, embodiments of the present disclosure can provide a touch display device comprising, a plurality of touch electrode lines comprising two or more touch electrodes disposed on an active area and at least some of the two or more touch electrodes are electrically connected to each other along a first direction or a second direction crossing the first direction, and a plurality of touch routing lines electrically connected to one of the plurality of touch electrode lines, wherein at least a portion of a first touch routing line of the plurality of touch routing lines is located on an area surrounded by a touch electrode line electrically connected to the first touch routing line.

In addition, a second touch routing line insulated from the first touch routing line can be disposed between the first touch routing line and the touch electrode line electrically connected to the first touch routing line.

In addition, a shielding pattern insulated from the first touch routing line and the second touch routing line can be disposed between the second touch routing line and the touch electrode line electrically connected to the first touch routing line.

According to various embodiments of the present disclosure, as the touch routing line is disposed on an area surrounded by the touch electrode line on an area where the touch electrode line is disposed, a load of the touch routing line can be reduced due to an addition of the touch routing line without an increase of an area for arranging the touch routing line.

According to various embodiments of the present disclosure, as adjusting a point that the plurality of touch routing lines are connected to the touch electrode line on an area where the touch electrode line is disposed, a performance of a touch sensing can be improved by minimizing a drop of the touch sensing sensitivity according to positions or reducing the difference of the touch sensing sensitivity.

BRIEF DESCRIPTION OF THE DRAWINGS

The above and other objects, features, and advantages of the present disclosure will be more clearly understood from the following detailed description, taken in conjunction with the accompanying drawings, in which.

DETAILED DESCRIPTION

Figure 1:
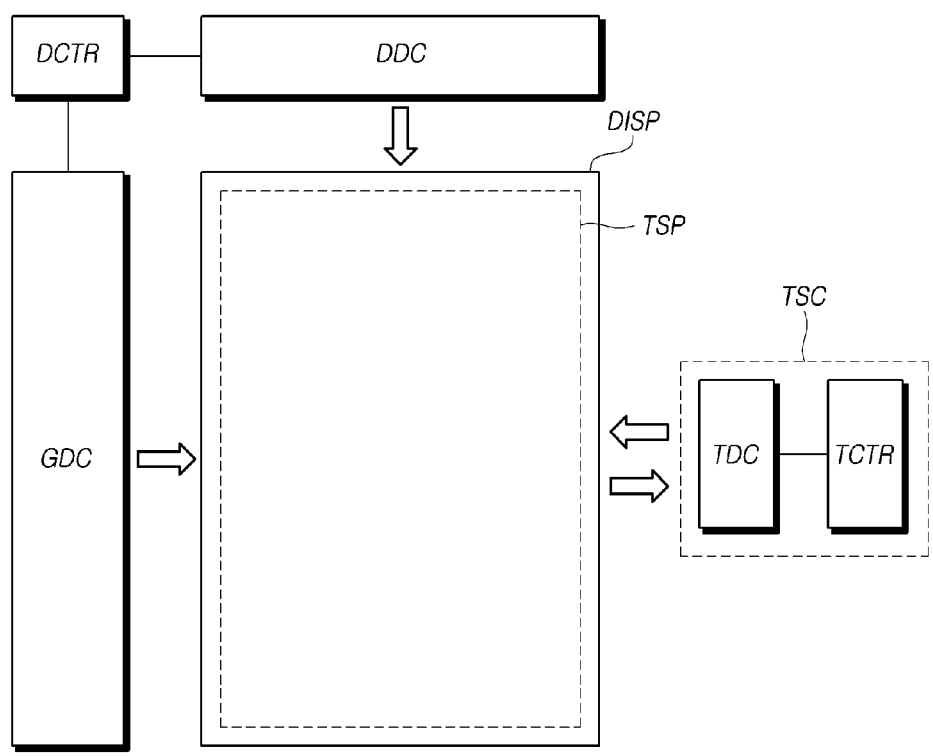
FIG. 1 is a diagram illustrating a schematic configuration of a touch display device according to embodiments of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

FIG. 1 is a diagram illustrating a system configuration of a touch display device according to embodiments.

Referring to FIG. 1, the touch display device according to embodiments of the present disclosure can provide both an image display function and a touch-sensing function.

To provide the image display function, the touch display device according to embodiments of the present disclosure can comprise: a display panel DISP in which a plurality of data lines and a plurality of gate lines are disposed and a plurality of subpixels defined by the plurality of data lines and the plurality of gate lines are arrayed; a data driver (or data driver circuit) DDC driving the plurality of data lines; a gate driver (or gate driver circuit) GDC driving the plurality of gate lines; a display controller DCTR controlling the data driver DDC and gate driver GDC, and the like.

Each of the data driver DDC, the gate driver GDC, and the display controller DCTR can be implemented as one or more separate components. In some cases, two or more of the data driver DDC, the gate driver GDC, and the display controller DCTR can be integrated into a single component. For example, the data driver DDC and the display controller DCTR can be implemented as a single integrated circuit (IC) chip.

To provide the touch-sensing function, the touch display device according to embodiments of the present disclosure can comprise: a touch panel TSP including a plurality of touch electrodes; and a touch-sensing circuit TSC supplying a touch driving signal to the touch panel TSP, detecting a touch-sensing signal from the touch panel TSP, and detecting a touch of a user or determining a touch position (touch coordinates) on the touch panel TSP on the basis of a detected touch-sensing signal.

For example, the touch-sensing circuit TSC can comprise: a touch driving circuit TDC supplying a touch driving signal to the touch panel TSP and detecting a touch-sensing signal from the touch panel TSP; a touch controller TCTR determining at least one of the touch of the user and the touch coordinates on the basis of the touch-sensing signal detected by the touch driving circuit TDC, and the like.

The touch driving circuit TDC can comprise a first circuit part supplying the touch driving signal to the touch panel TSP and a second circuit part detecting the touch-sensing signal from the touch panel TSP.

The touch driving circuit TDC and the touch controller TCTR can be provided as separate components or, in some cases, can be integrated into a single component.

In addition, each of the data driver DDC, the gate driver GDC, and the touch driving circuit TDC is implemented as one or more ICs, and in terms of electrical connection to the display panel DISP, can have a chip-on-glass (COG) structure, a chip-on-film (COF) structure, a tape carrier package (TCP) structure, or the like. In addition, the gate driver GDC can have a gate-in-panel (GIP) structure.

In addition, each of the circuit configurations DDC, GDC, and DCTR for display driving and the circuit configurations TDC and TCTR for touch sensing can be implemented as one or more separate components. In some cases, one or more of the display driving circuit configurations DDC, GDC, and DCTR and one or more of the touch-sensing circuit configurations TDC and TCTR can be functionally integrated into one or more components.

For example, the data driver DDC and the touch driving circuit TDC can be integrated into one or more IC chips. In a case in which the data driver DDC and the touch driving circuit TDC are integrated into two or more IC chips, each of the two or more IC chips can have both a data driving function and a touch driving function.

In addition, the touch display device according to embodiments of the present disclosure can be various types of devices, such as an organic light-emitting diode (OLED) display device and a liquid crystal display (LCD) device. Hereinafter, the touch display device will be described as an OLED display device for the sake of brevity. That is, although the display panel DISP can be various types of devices, such as an OLED and an LCD, the display panel DISP will be described as an OLED panel as an example for the sake of brevity.

In addition, as will be described later, the touch panel TSP can comprise a plurality of touch electrodes to which the touch driving signal is applicable or from which the touch-sensing signal is detectable; a plurality of touch routing lines connecting the plurality of touch electrodes to the touch driving circuit TDC; and the like.

The touch panel TSP can be located outside of the display panel DISP. That is, the touch panel TSP and the display panel DISP can be fabricated separately and combined thereafter. Such a touch panel TSP is referred to as an "add-on touch panel" in one embodiment.

Alternatively, the touch panel TSP can be disposed inside of the display panel DISP. That is, when the display panel DISP is fabricated, touch sensor structures of the touch panel TSP, including the plurality of touch electrodes, the plurality of touch routing lines, and the like, can be provided together with electrodes and signal lines used for the display driving. Such a touch panel TSP is referred to as an in-cell touch panel. Hereinafter, for the sake of brevity, the touch panel TSP will be described as an in-cell touch panel TSP as an example.

Figure 2:
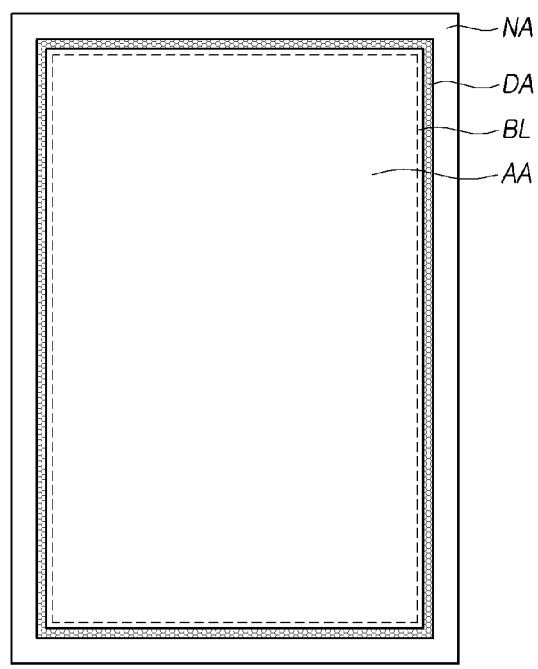
FIG. 2 is a diagram schematically illustrating a display panel of a touch display device according to embodiments of the present disclosure.

FIG. 2 is a diagram schematically illustrating the display panel DISP of the touch display device according to embodiments of the present disclosure.

Referring to FIG. 2, the display panel DISP can comprise an active area AA on which images are displayed and a non-active area NA located outside of an outer boundary line BL of the active area AA.

In the active area AA of the display panel DISP, a plurality of subpixels for displaying images are arrayed, and a variety of electrodes and signal lines for the display driving area are disposed.

In addition, the plurality of touch electrodes for the touch sensing, the plurality of touch routing lines electrically connected to the plurality of touch electrodes, and the like can be disposed in the active area AA of the display panel DISP. Accordingly, the active area AA can also be referred to as a touch-sensing area in which the touch sensing can be performed.

In the non-active area NA of the display panel DISP, link lines produced by extending a variety of signal lines disposed in the active area AA or link lines electrically connected to the variety of signal lines disposed in the active area AA and pads electrically connected to the link lines can be disposed. The pads disposed in the non-active area NA can be bonded or electrically connected to the display driving circuits, such as DDC and GDC.

In addition, in the non-active area NA of the display panel DISP, link lines produced by extending a plurality of touch routing lines disposed in the active area AA or link lines electrically connected to the plurality of touch routing lines disposed in the active area AA and pads electrically connected to the link lines can be disposed. The pads disposed in the non-active area NA can be bonded or electrically connected to the touch driving circuit TDC.

In the non-active area NA, portions produced by expanding portions of the outermost touch electrodes among the plurality of touch electrodes disposed in the active area AA can be provided, and one or more electrodes (e.g., touch electrodes) made of the same material as the plurality of touch electrodes disposed in the active area AA can be further disposed.

That is, the entirety of the plurality of touch electrodes disposed in the display panel DISP can be located in the active area AA, specific touch electrodes (e.g., the outermost touch electrodes) among the plurality of touch electrodes disposed in the display panel DISP can be located in the non-active area NA, or specific touch electrodes (e.g., the outermost touch electrodes) among the plurality of touch electrodes disposed in the display panel DISP can extend across at least a portion of the active area AA and at least a portion of the non-active area NA.

In addition, referring to FIG. 2, the display panel DISP of the touch display device according to embodiments of the present disclosure can comprise a dam area DA in which a dam DAM (see FIG. 9) is disposed, the dam DAM serving to prevent or reduce collapsing of a layer (e.g., an encapsulation layer in the OLED display panel) in the active area AA.

The dam area DA can be located at the boundary between the active area AA and the non-active area NA, in a location of the non-active area NA at the periphery of the active area AA, or the like.

The dam disposed in the dam area DA can be disposed to surround the active area AA in all directions or only at the periphery of one or more portions (i.e., portions in which a fragile layer is located) of the active area AA.

The dams disposed in the dam area DA can be connected to be made as a single pattern or to be made as two or more separate patterns. In addition, in the dam area DA, only a first dam can be disposed, or two dams (i.e., a first dam and a second dam) can be disposed, or three or more dams can be disposed.

In the dam area DA, the first dam can only be provided in one direction, and both the first dam and the second dam can be provided in the other direction.

Figure 3:
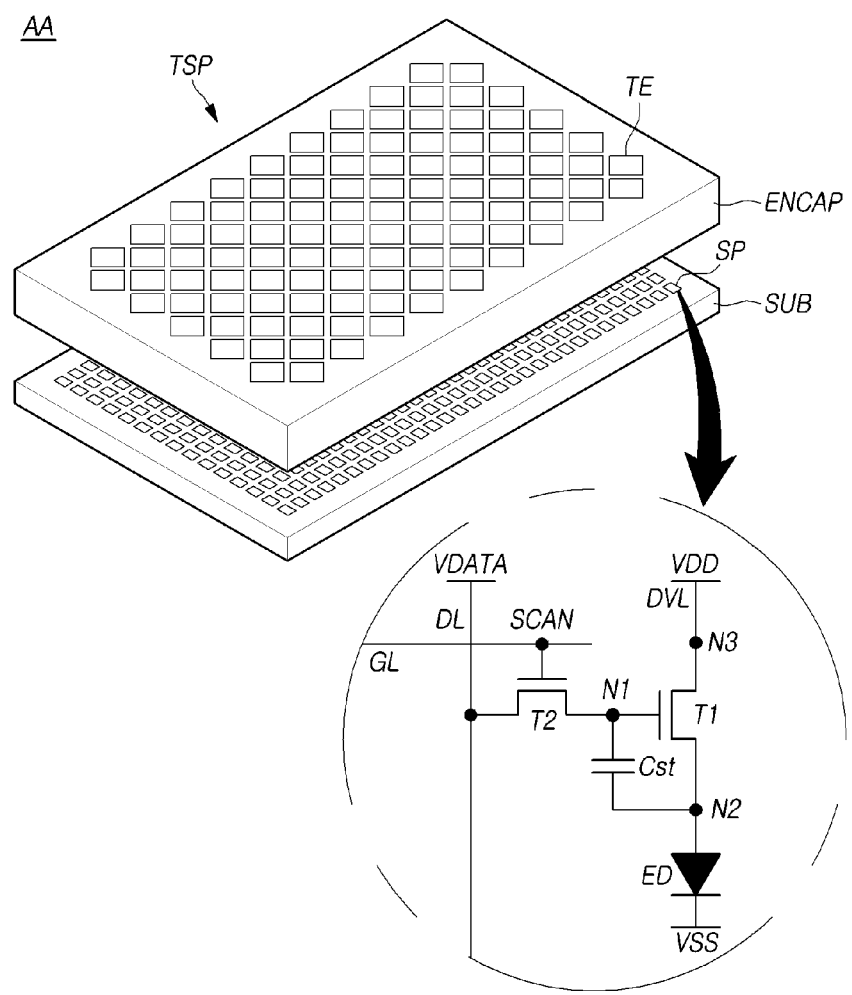
FIG. 3 is a diagram illustrating a structure in which a touch panel is disposed as an in-cell structure in a display panel according to embodiments of the present disclosure.

FIG. 3 is a diagram illustrating a structure in which the touch panel TSP is disposed as an in-cell structure in the display panel DISP according to embodiments of the present disclosure.

Referring to FIG. 3, a plurality of subpixels SP are arrayed on a substrate SUB in the active area AA of the display panel DISP.

Each of the subpixels SP can comprise an emitting device ED, a first transistor T1 driving the emitting device ED, a second transistor T2 delivering a data voltage VDATA to a first node N1 of the first transistor T1, a storage capacitor Cst maintaining a predetermined voltage for a single frame, and the like.

The first transistor T1 can comprise the first node N1 to which the data voltage VDATA is applicable, a second node N2 electrically connected to the emitting device ED, and a third node N3 to which a driving voltage VDD is applied from a driving voltage line DVL. The first node N1 can be a gate node, the second node N2 can be a source node or a drain node, and the third node N3 can be a drain node or a source node. Such a first transistor T1 is also referred to as a driving transistor driving the emitting device ED.

The emitting device ED can comprise a first electrode (e.g., an anode), an emissive layer, and a second electrode (e.g., a cathode). The first electrode can be electrically connected to the second node N2 of the first transistor T1, and the second electrode can have a base voltage VSS applied thereto.

The emissive layer of the emitting device ED can be an organic emissive layer containing an organic material. In this case, the emitting device ED can be an organic light-emitting diode (OLED).

The second transistor T2 can be on/off controlled by a scan signal SCAN applied through a gate line GL and be electrically connected to the first node N1 of the first transistor T1 and a data line DL. Such a second transistor T2 is also referred to as a switching transistor.

When the second transistor T2 is turned on by the scan signal SCAN, the second transistor T2 delivers the data voltage VDATA supplied through the data line DL to the first node N1 of the first transistor T1.

The storage capacitor Cst can be electrically connected to the first node N1 and the second node N2 of the first transistor T1.

As illustrated in FIG. 3, each of the subpixels SP can have a 2T1C comprised of two transistors T1 and T2 and a single capacitor Cst. In some cases, each of the subpixels SP can further comprise one or more transistors or one or more capacitors.

The storage capacitor Cst can be an external capacitor intentionally designed to be disposed externally of the first transistor T1, rather than a parasitic capacitor (e.g., Cgs or Cgd), i.e., an internal capacitor present between the first node N1 and the second node N2 of the first transistor T1.

Each of the first transistor T1 and the second transistor T2 can be an n-type transistor or a p-type transistor.

As described above, circuit components, including the emitting device ED, two or more transistors T1 and T2, and one or more capacitor Cst, are disposed in the display panel DISP. Since such circuit components (in particular, the emitting device ED) are vulnerable to external moisture, oxygen, or the like, an encapsulation layer ENCAP can be disposed in the display panel DISP to prevent or reduce penetration of external moisture or oxygen into the circuit elements (in particular, the emitting device ED).

Such an encapsulation layer ENCAP can be a single layer or have a multilayer structure.

In addition, in the touch display device according to embodiments of the present disclosure, the touch panel TSP can be disposed on the encapsulation layer ENCAP.

That is, in the touch display device, a touch sensor structure, including the plurality of touch electrodes TE, of the touch panel TSP can be disposed on the encapsulation layer ENCAP.

In the touch sensing, the touch driving signal or the touch-sensing signal can be applied to the touch electrodes TE. Then, in the touch sensing, a potential difference can be produced between a touch electrode TE and a cathode disposed on both sides of the encapsulation layer ENCAP, thereby generating unnecessary parasitic capacitance. Since such parasitic capacitance can reduce touch sensitivity, the distance between the touch electrode TE and the cathode can be designed to be a predetermined value (e.g., 1 μm) or more in consideration of the thickness of the panel, a panel fabrication process, display performance, and the like in order to reduce the parasitic capacitance. In this regard, for example, the thickness of the encapsulation layer ENCAP can be designed to be 1 μm or more.

Figure 4:
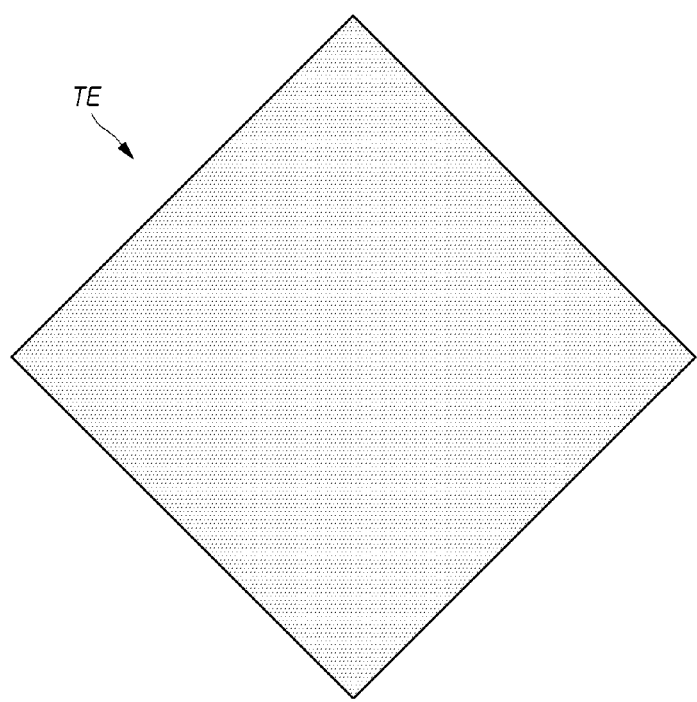
FIGS. 4 and 5 are diagrams illustrating types of touch electrodes disposed in a display panel according to embodiments of the present disclosure.
Figure 5:
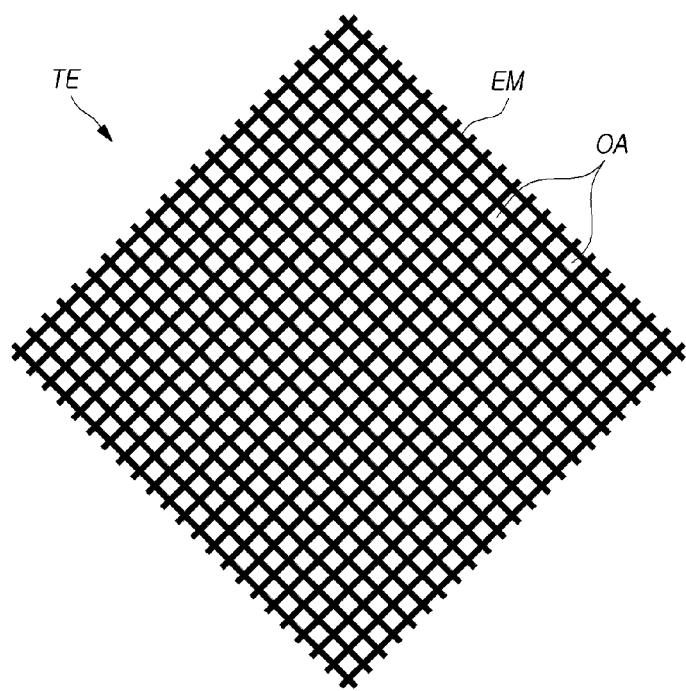

FIGS. 4 and 5 are diagrams illustrating types of touch electrodes TE disposed in the display panel DISP according to embodiments of the present disclosure.

As illustrated in FIG. 4, each of the touch electrodes TE disposed in the display panel DISP can be a plate-shaped electrode metal without an open area. In this case, each of the touch electrodes TE can be a transparent electrode. That is, each of the touch electrodes TE can be made of a transparent electrode material such that light emitted by the plurality of subpixels SP disposed below the touch electrodes TE can pass through the touch electrodes TE.

Alternatively, as illustrated in FIG. 5, each of the touch electrodes TE disposed in the display panel DISP can be an electrode metal EM in the shape of a patterned mesh having two or more open areas OA.

The electrode metal EM is a portion substantially corresponding to the touch electrode TE and is a portion to which the touch driving signal is applied or from which the touch-sensing signal is detected.

As illustrated in FIG. 5, in a case in which each of the touch electrodes TE is the electrode metal EM in the shape of a patterned mesh, two or more open areas OA can be present in the area of the touch electrode TE.

Each of the plurality of open areas OA provided in each of the touch electrodes TE can correspond to the emitting area of one or more subpixels SP. That is, the plurality of open areas OA are passages allowing light emitted from the plurality of subpixels SP located there below to pass upward therethrough. Hereinafter, for the sake of brevity, each of the touch electrodes TE will be described as a mesh-shaped electrode metal EM as an example.

The electrode metal EM corresponding to each of the touch electrodes TE can be located on a bank disposed in an area, except for the emitting area of two or more subpixels SP.

In addition, a method of fabricating a plurality of touch electrode TE can comprise making a mesh-shaped electrode metal EM having a wider area and then cutting the electrode metal EM to be made as a predetermined pattern such that portions of the electrode metal EM are electrically separated from each other, thereby fabricating a plurality of touch electrodes TE.

The outline of the touch electrode TE can have a rectangular shape, such as a diamond or a rhombus shape, as illustrated in FIGS. 4 and 5, or a variety of other shapes, such as a triangle, a pentagon, or a hexagon.

Figure 6:
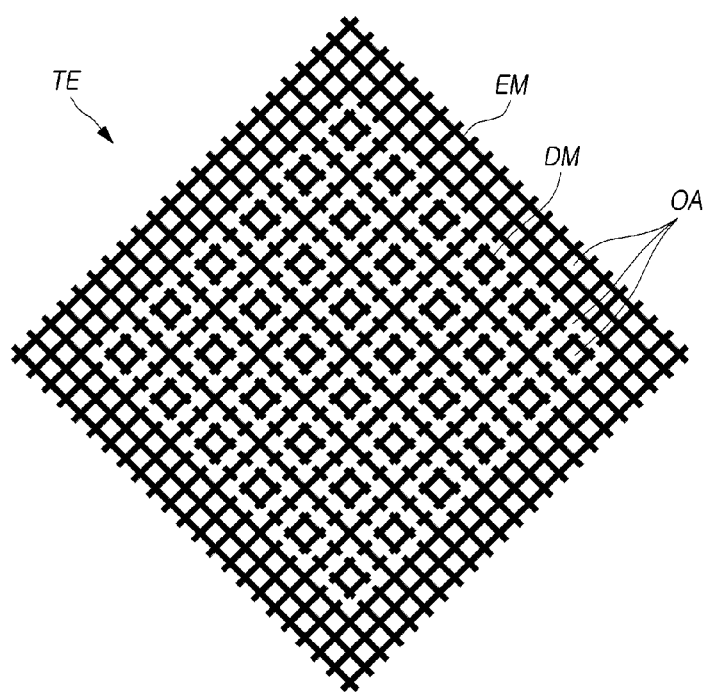
FIG. 6 is a diagram illustrating the mesh-shaped touch electrode illustrated in FIG. 5 according to embodiments of the present disclosure.

FIG. 6 is a diagram illustrating the mesh-shaped touch electrode TE illustrated in FIG. 5 according to one embodiment.

Referring to FIG. 6, in the area of each of the touch electrodes TE, one or more dummy metals DM disconnected from the mesh-shaped electrode metal EM can be provided.

The electrode metal EM is a portion substantially corresponding to the touch electrode TE and is a portion to which the touch driving signal is applied or from which the touch-sensing signal is detected. In contrast, the dummy metals DM are portions to which the touch driving signal is not applied and from which the touch-sensing signal is not detected, although the dummy metals DM are portions located in the area of the touch electrode TE. That is, the dummy metals DM can be electrically floating metals.

Thus, the electrode metal EM can be electrically connected to the touch driving circuit TDC, but none of the dummy metals DM are electrically connected to the touch driving circuit TDC.

In the area of each of the entire touch electrodes TE, one or more dummy metals DM can be provided while being disconnected from the electrode metals EM.

Alternatively, one or more dummy metals DM can be provided in the area of each of specific touch electrodes TE among the entire touch electrodes TE while being disconnected from the electrode metal EM. That is, no dummy metals DM can be provided in the areas of the other touch electrodes TE.

The function of the dummy metals DM is related to a visibility issue. In a case in which only the mesh-shaped electrode metal EM is present in the area of the touch electrode TE without one or more dummy metals DM being present in the area of the touch electrode TE as illustrated in FIG. 5, the outline of the electrode metal EM can appear on the screen, thereby causing a visibility issue.

In contrast, in a case in which one or more dummy metals DM are present in the area of the touch electrode TE as illustrated in FIG. 6, the outline of the electrode metal EM appearing on the screen, i.e. the visibility issue, can be prevented.

In addition, touch sensitivity can be improved by adjusting the magnitude of capacitance according to each of the touch electrodes TE by adjusting the presence or absence or the number (or ratio) of the dummy metals DM of each of the touch electrodes TE.

In addition, specific points of the electrode metal EM provided in the area of a single touch electrode TE can be cut, so that the cut electrode metal EM form dummy metals DM. That is, the electrode metal EM and the dummy metals DM can be made of the same material provided on the same layer.

In addition, the touch display device according to embodiments of the present disclosure can detect a touch on the basis of capacitance generated on the touch electrode TE.

The touch display device according to embodiments of the present disclosure can detect a touch by a capacitance-based touch sensing method, more particularly, mutual capacitance-based touch sensing or self-capacitance-based touch sensing.

In the mutual capacitance-based touch sensing, the plurality of touch electrodes TE can be divided into driving touch electrodes (or transmitting touch electrodes) to which the touch driving signal is applied and sensing touch electrodes (or receiving touch electrodes) detecting the touch sensing signal and generating capacitance together with the driving touch electrodes.

In the mutual capacitance-based touch sensing, the touch-sensing circuit TSC detects a touch and determines touch coordinates on the basis of changes in the capacitance (i.e., mutual capacitance) occurring between the driving touch electrodes and the sensing touch electrodes, depending on the presence or absence of a pointer, such as a finger or a pen.

In the self-capacitance-based touch sensing, each of the touch electrodes TE serves as both a driving touch electrode and a sensing touch electrode. That is, the touch-sensing circuit TSC detects a touch and determines touch coordinates by applying the touch driving signal to one or more touch electrodes TE, detecting the touch-sensing signal through the touch electrode TE to which the touch driving signal is applied, and recognizing changes in the capacitance between the pointer, such as a finger or a pen, and the touch electrode TE, on the basis of the detected touch-sensing signal. Accordingly, in the self-capacitance-based touch sensing, there is no difference between the driving touch electrodes and the sensing touch electrodes.

As described above, the touch display device according to embodiments of the present disclosure can perform the touch sensing by the mutual capacitance-based touch sensing or the self-capacitance-based touch sensing. Hereinafter, for the sake of brevity, the touch display device performing the mutual capacitance-based touch sensing and having a touch sensor structure for the mutual capacitance-based touch sensing will be described as an example.

Figure 7:
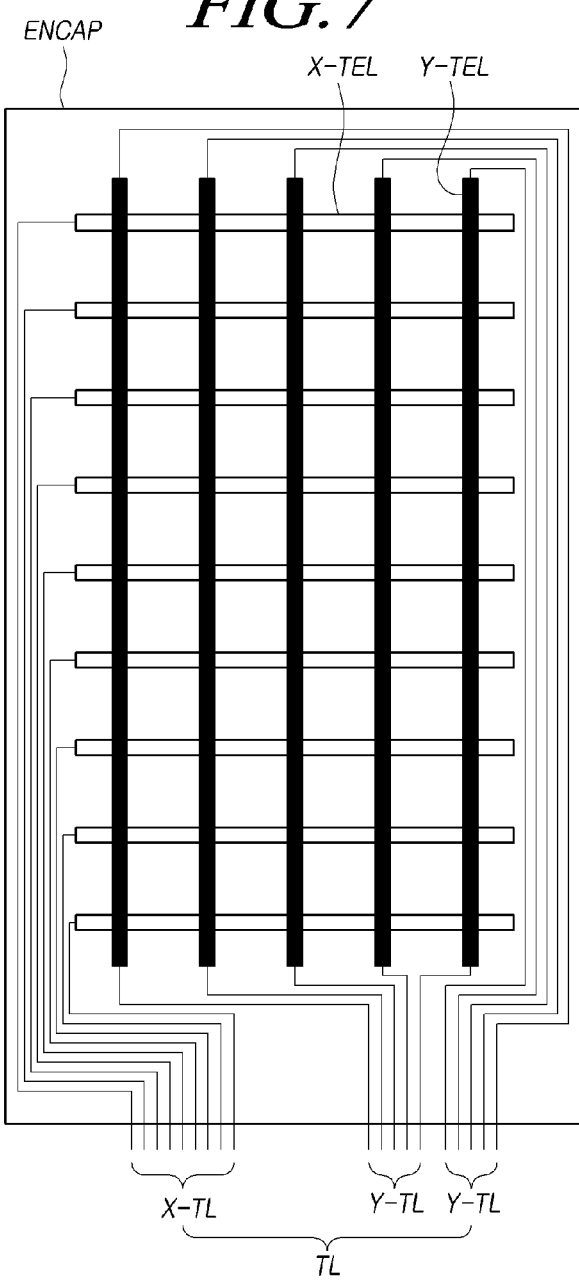
FIG. 7 is a diagram schematically illustrating a touch sensor structure in a display panel according to embodiments of the present disclosure.
Figure 8:
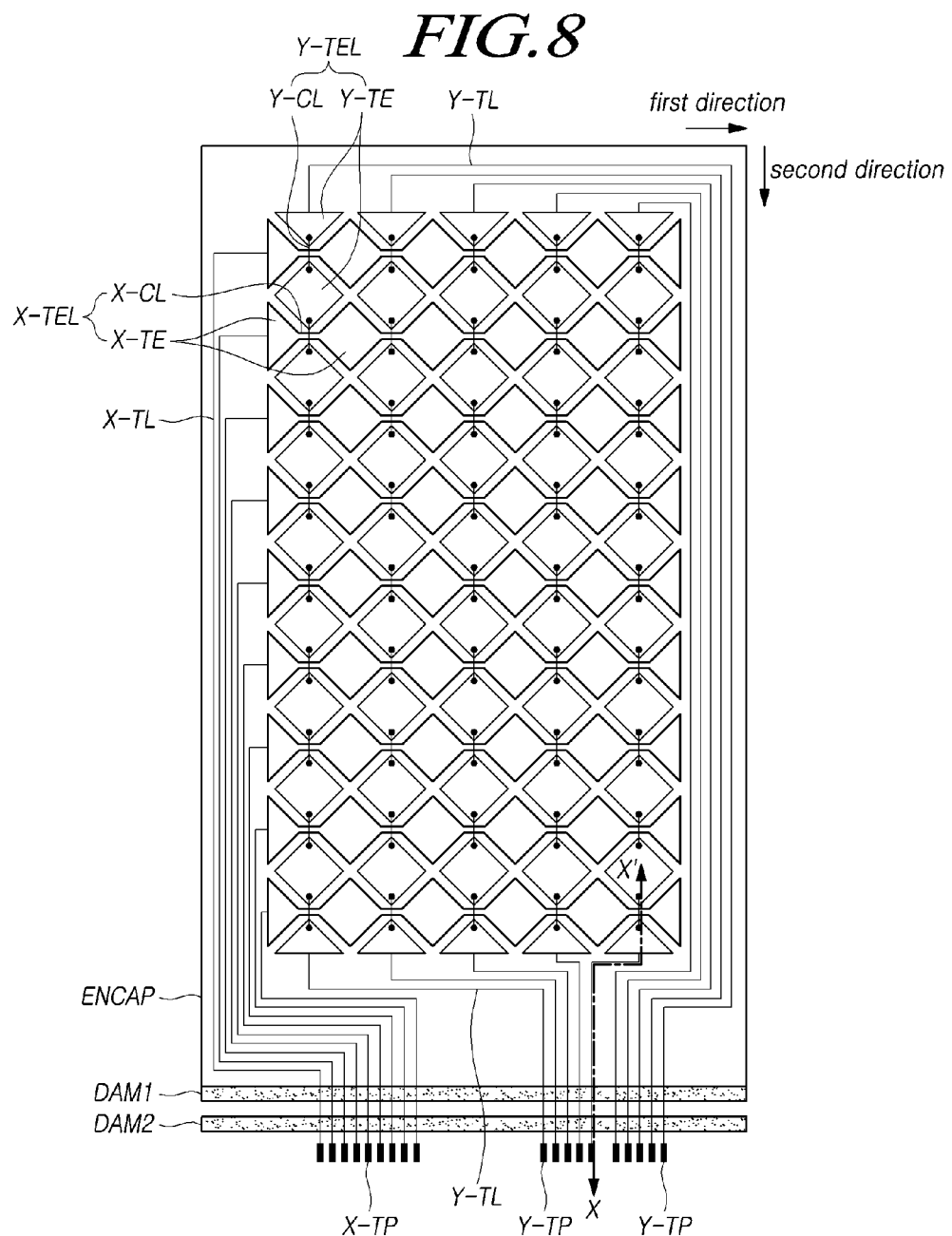
FIG. 8 is a diagram illustrating an example of the touch sensor structure illustrated in FIG. 7 according to embodiments of the present disclosure.

FIG. 7 is a diagram schematically illustrating a touch sensor structure in the display panel DISP according to embodiments of the present disclosure, and FIG. 8 is a diagram illustrating an example of the touch sensor structure illustrated in FIG. 7 according to one embodiment.

Referring to FIG. 7, the touch sensor structure for the mutual capacitance-based touch sensing can comprise a plurality of X-touch electrode lines X-TEL and a plurality of Y-touch electrode lines Y-TEL. Here, the plurality of X-touch electrode lines X-TEL and the plurality of Y-touch electrode lines Y-TEL are located on the encapsulation layer ENCAP.

Each of the plurality of X-touch electrode lines X-TEL can be disposed in a first direction, and the plurality of Y-touch electrode lines Y-TEL can be disposed in a second direction different from the first direction.

Herein, the first direction and the second direction can be different directions. For example, the first direction can be the X-axis direction, while the second direction can be the Y-axis direction. Alternatively, the first direction can be the Y-axis direction, while the second direction can be the X-axis direction. In addition, the first direction and the second direction can or cannot intersect perpendicularly. In addition, the terms "column" and "row" as used herein are relative terms. The column and the row can be switched depending on the viewing perspective.

Each of the plurality of X-touch electrode lines X-TEL can be comprised of a plurality of X-touch electrodes X-TE electrically connected to each other. Each of the plurality of Y-touch electrode lines Y-TEL can be comprised of a plurality of Y-touch electrodes Y-TE electrically connected to each other.

Here, the plurality of X-touch electrodes X-TE and the plurality of Y-touch electrodes Y-TE are electrodes included in the plurality of touch electrodes TE, and have different functions.

For example, the plurality of X-touch electrodes X-TE constituting each of the plurality of X-touch electrode lines X-TEL can be the driving touch electrodes, while the plurality of Y-touch electrodes Y-TE constituting each of the plurality of Y-touch electrode lines Y-TEL can be the sensing touch electrodes. In this case, each of the plurality of X-touch electrode lines X-TEL corresponds to a driving touch electrode lines, and each of the plurality of Y-touch electrode lines Y-TEL corresponds to a sensing touch electrode line.

Alternatively, the plurality of X-touch electrodes X-TE constituting each of the plurality of X-touch electrode lines X-TEL can be the sensing touch electrodes, while the plurality of Y-touch electrodes Y-TE constituting each of the plurality of Y-touch electrode lines Y-TEL can be the driving touch electrodes. In this case, each of the plurality of X-touch electrode lines X-TEL corresponds to the sensing touch electrode line, and each of the plurality of Y-touch electrode lines Y-TEL corresponds to the driving touch electrode line.

A touch sensor metal TSM for the touch sensing can comprise a plurality of touch routing lines TL in addition to the plurality of X-touch electrode lines X-TEL and the plurality of Y-touch electrode lines Y-TEL.

The plurality of touch routing lines TL can comprise one or more X-touch routing lines X-TL connected to the plurality of X-touch electrode lines X-TEL, respectively, and one or more Y-touch routing lines Y-TL connected to the plurality of Y-touch electrode lines Y-TEL, respectively.

Referring to FIG. 8, each of the plurality of X-touch electrode lines X-TEL can comprise a plurality of X-touch electrodes X-TE disposed in the same row (or column) and one or more X-touch electrode connecting lines X-CL electrically connecting the plurality of X-touch electrodes X-TE. Here, the X-touch electrode connecting lines X-CL respectively connecting two adjacent X-touch electrodes X-TE can be metals integrated with the two adjacent X-touch electrodes X-TE (see FIG. 8) or metals connected to the two adjacent X-touch electrodes X-TE via contact holes.

Each of the plurality of Y-touch electrode lines Y-TEL can comprise a plurality of Y-touch electrodes Y-TE disposed in the same column (or row) and one or more Y-touch electrode connecting lines Y-CL electrically connecting the plurality of Y-touch electrodes Y-TE. Here, the Y-touch electrode connecting lines Y-CL respectively connecting two adjacent Y-touch electrodes Y-TE can be metals integrated with the two adjacent Y-touch electrodes Y-TE or metals connected to the two adjacent Y-touch electrodes Y-TE via contact holes (see FIG. 8).

In areas in which the X-touch electrode lines X-TEL intersect the Y-touch electrode lines Y-TEL (i.e., touch electrode line intersecting areas), the X-touch electrode connecting lines X-CL can intersect the Y-touch electrode connecting lines Y-CL.

In a case in which the X-touch electrode connecting lines X-CL intersect the Y-touch electrode connecting lines Y-CL in the touch electrode line intersecting areas as described above, the X-touch electrode connecting lines X-CL must be located on a layer different from that of the Y-touch electrode connecting lines Y-CL.

Accordingly, the plurality of X-touch electrodes X-TE, the plurality of X-touch electrode connecting lines X-CL, the plurality of Y-touch electrodes Y-TE, the plurality of Y-touch electrode lines Y-TEL, and the plurality of Y-touch electrode connecting lines Y-CL can be located on two or more layers, such that the plurality of X-touch electrode lines X-TEL intersect the plurality of Y-touch electrode lines Y-TEL.

Referring to FIG. 8, each of the plurality of X-touch electrode lines X-TEL is electrically connected to a corresponding X-touch pad X-TP through one or more X-touch routing lines X-TL. That is, the outermost X-touch electrode X-TE among the plurality of X-touch electrodes X-TE included in a single X-touch electrode line X-TEL is electrically connected to a corresponding X-touch pad X-TP via the X-touch routing line X-TL.

Each of the plurality of Y-touch electrode lines Y-TEL is electrically connected to corresponding Y-touch pads Y-TP through one or more Y-touch routing lines Y-TL. That is, the outermost Y-touch electrodes Y-TE among the plurality of Y-touch electrodes Y-TE included in a single Y-touch electrode line Y-TEL is electrically connected to the corresponding Y-touch pads Y-TP through the Y-touch routing lines Y-TL.

In addition, as illustrated in FIG. 8, the plurality of X-touch electrode lines X-TEL and the plurality of Y-touch electrode lines Y-TEL can be disposed on the encapsulation layer ENCAP. That is, the plurality of X-touch electrodes X-TE, constituting the plurality of X-touch electrode lines X-TEL, and the plurality of X-touch electrode connecting lines X-CL can be disposed on the encapsulation layer ENCAP. The plurality of Y-touch electrodes Y-TE, constituting the plurality of Y-touch electrode lines Y-TEL, and the plurality of Y-touch electrode connecting lines Y-CL can be disposed on the encapsulation layer ENCAP.

In addition, as illustrated in FIG. 8, the plurality of X-touch routing lines X-TL electrically connected to the plurality of X-touch electrode lines X-TEL can be disposed on the encapsulation layer ENCAP and extend to a location in which the encapsulation layer ENCAP is not provided, thereby being electrically connected to a plurality of X-touch pads X-TP, respectively. The plurality of Y-touch routing lines Y-TL electrically connected to the plurality of Y-touch electrode lines Y-TEL can be disposed on the encapsulation layer ENCAP and extend to a location in which encapsulation layer ENCAP is not provided, thereby being electrically connected to a plurality of Y-touch pads Y-TP, respectively. Here, the encapsulation layer ENCAP can be located in the active area AA and, in some cases, can expand to the non-active area NA.

In addition, as described above, a dam area DA can be provided at the boundary between the active area AA and the non-active area NA or in the non-active area NA at the periphery of the active area AA in order to prevent a layer (e.g., an encapsulation in the OLED display panel) in the active area AA from collapsing.

As illustrated in FIG. 8, for example, a first dam DAM1 and a second dam DAM2 can be disposed in the dam area DA. Here, the second dam DAM2 can be located more outward than the first dam DAM1.

In a manner different from that illustrated in FIG. 8, only the first dam DAM1 can be located in the dam area DA. In some cases, not only the first dam DAM1 and the second dam DAM2, but also one or more additional dams can be disposed in the dam area DA.

Referring to FIG. 8, the encapsulation layer ENCAP can be located on a side of the first dam DAM1 or be located both on a side of and above the first dam DAM1.

Figure 9:
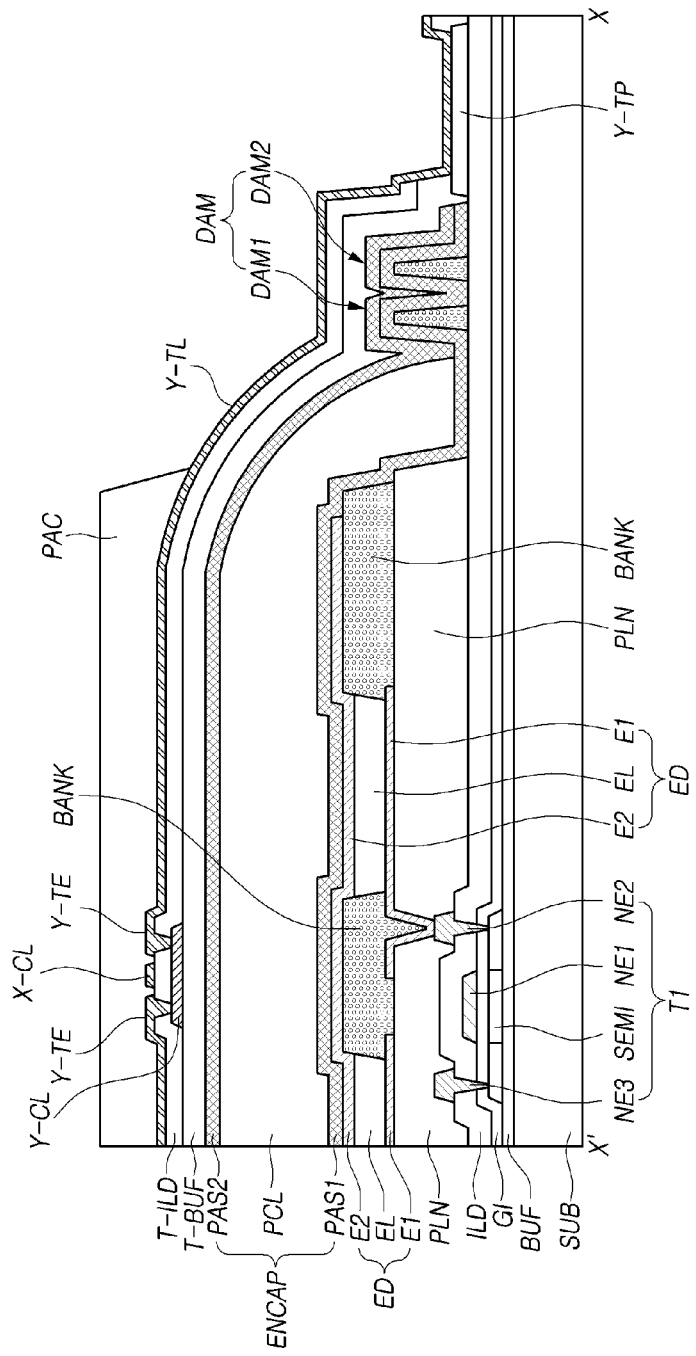
FIG. 9 is a cross-sectional diagram illustrating portions of the display panel taken along line X-X' in FIG. 8 according to embodiments of the present disclosure.

FIG. 9 is a cross-sectional diagram illustrating portions of the display panel DISP taken along line X-X' in FIG. 8 according to embodiments of the present disclosure. In FIG. 9, the touch electrode TE is illustrated in the shape of a plate. However, this is illustrative only, and the touch electrode TE can be mesh shaped. In a case in which the touch electrode TE is mesh shaped, the open areas OA of the touch electrode TE can be located above the emissive areas of subpixels SP.

The first transistor T1, i.e., the driving transistor in each of the subpixels SP in the active area AA, is disposed on the substrate SUB.

The first transistor T1 comprises a first node electrode NE1 corresponding to the gate electrode, a second node electrode NE2 corresponding to a source electrode or a drain electrode, a third node electrode NE3 corresponding to a drain electrode or a source electrode, a semiconductor layer SEMI, and the like.

The first node electrode NE1 and the semiconductor layer SEMI can be located on both sides of a gate insulating film GI to overlap each other. The second node electrode NE2 can be provided on an insulating layer ILD to be in contact with one side of the semiconductor layer SEMI, while the third node electrode NE3 can be provided on the insulating layer ILD to be in contact with the other side of the semiconductor layer SEMI.

The emitting device ED can comprise a first electrode E1 corresponding to an anode (or cathode), an emitting layer EL provided on the first electrode E1, a second electrode E2 corresponding to a cathode (or anode) provided on the emitting layer EL, and the like.

The first electrode E1 is electrically connected to the second node electrode NE2 of the first transistor T1, exposed through a pixel contact hole extending through a planarization layer PLN.

The emitting layer EL is provided on the first electrode E1 in the emitting area provided by banks BANK. The emitting layer EL is provided on the first electrode E1 and is comprised of a hole-related layer, an emissive layer, and an electron-related layer stacked in the stated order or inversely. The second electrode E2 is provided on the side of the emitting layer EL opposite to the first electrode E1.

The encapsulation layer ENCAP prevents or reduces penetration of external moisture or oxygen into the emitting device ED which is vulnerable to external moisture, oxygen, or the like.

The encapsulation layer ENCAP can be a single layer or, as illustrated in FIG. 9, be comprised of a plurality of layers PAS1, PCL, and PAS2.

For example, in a case in which the encapsulation layer ENCAP is comprised of the plurality of layers PAS1, PCL, and PAS2, the encapsulation layer ENCAP can comprise one or more inorganic encapsulation layers PAS1 and PAS2 and one or more organic encapsulation layers PCL. As a specific example, the encapsulation layer ENCAP can have a structure in which the first inorganic encapsulation layer PAS1, the organic encapsulation layer PCL, and the second inorganic encapsulation layer PAS2 are stacked in order.

Here, the organic encapsulation layer PCL can further comprise at least one organic encapsulation layer or at least one inorganic encapsulation layer.

The first inorganic encapsulation layer PAS1 is provided on the substrate SUB, on which the second electrode E2 corresponding to the cathode is provided, so as to be closest to the emitting device ED. The first inorganic encapsulation layer PAS1 is made of an inorganic insulating material, such as silicon nitride (SiNx), silicon oxide (SiOx), silicon oxynitride (SiON), or aluminum oxide ($Al_2O_3$), which can be deposited at a low temperature. Since the first inorganic encapsulation layer PAS1 is deposited in a low-temperature atmosphere, the first inorganic encapsulation layer PAS1 can prevent the emitting layer EL containing an organic material vulnerable to a high-temperature atmosphere from being damaged during deposition processing.

The organic encapsulation layer PCL can be provided in an area smaller than the area of the first inorganic encapsulation layer PAS1. In this case, the organic encapsulation layer PCL can be configured to expose both edges of the first inorganic encapsulation layer PAS1. The organic encapsulation layer PCL can serve as a buffer to reduce stress between the layers caused by bending of the touch display device and serve to enhance planarization performance. The organic encapsulation layer PCL can be made of, for example, an organic insulating material, such as an acrylic resin, an epoxy resin, polyimide, polyethylene, silicon oxycarbide (SiOC).

In addition, in a case in which the organic encapsulation layer PCL is fabricated by inkjet printing, one or more dams DAM can be provided in the dam area DA corresponding to the boundary between the non-active area NA and the active area AA or a portion of the non-active area NA.

For example, as illustrated in FIG. 9, the dam area DA is located between a pad area in the non-active area NA and the active area AA. The pad area refers to a portion of the non-active area NA in which the plurality of X-touch pads X-TP and the plurality of Y-touch pads Y-TP are provided. In the dam area DA, the first dam DAM1 adjacent to the active area AA and the second dam DAM2 adjacent to the pad area can be provided.

The one or more dams DAM disposed in the dam area DA can prevent or reduce collapsing of the organic encapsulation layer PCL in a liquid in the direction of the non-active area NA and penetrating into the pad area when the organic encapsulation layer PCL in the liquid form is dropped to the active area AA.

This effect can be further increased by the provision of the first dam DAM1 and the second dam DAM2 as illustrated in FIG. 9.

At least one of the first dam DAM1 and the second dam DAM2 can have a single layer or multilayer structure. For example, at least one of the first dam DAM1 and the second dam DAM2 can be simultaneously made of the same material as at least one of the banks BANK and spacers (not shown). In this case, a dam structure can be provided without additional mask processing or an increase in cost.

In addition, as illustrated in FIG. 9, at least one of the first dam DAM1 and the second dam DAM2 can have a structure in which at least one of the first inorganic encapsulation layer PAS1 and the second inorganic encapsulation layer PAS2 is stacked on the banks BANK.

In addition, the organic encapsulation layer PCL containing an organic material can be located on an inner side of the first dam DAM1, as illustrated in FIG. 9.

Alternatively, the organic encapsulation layer PCL containing an organic material can be located above at least a portion of the first dam DAM1 and the second dam DAM2. For example, the organic encapsulation layer PCL can be located above the first dam DAM1.

The second inorganic encapsulation layer PAS2 can be provided on the substrate SUB on which the organic encapsulation layer PCL is provided, so as to cover the top surfaces and side surfaces of the organic encapsulation layer PCL and the first inorganic encapsulation layer PAS1. The second inorganic encapsulation layer PAS2 reduces or prevents external moisture or oxygen from penetrating the first inorganic encapsulation layer PAS1 or the organic encapsulation layer PCL. The second inorganic encapsulation layer PAS2 is made of, for example, an inorganic insulating material, such as SiNx, SiOx, SiON, or $Al_2O_3$.

A touch buffer film T-BUF can be provided on the encapsulation layer ENCAP. The touch buffer film T-BUF can be located between the touch sensor metal TSM, including the X and Y-touch electrodes X-TE and Y-TE and X and Y-touch electrode connecting lines X-CL and Y-CL, and the second electrode E2 of the emitting device ED.

The touch buffer film T-BUF can be designed to maintain a predetermined minimum distance (e.g. 1 μm) between the touch sensor metal TSM and the second electrode E2 of the emitting device ED. Accordingly, this can reduce or prevent parasitic capacitance generated between the touch sensor metal TSM and the second electrode E2 of the emitting device ED, thereby preventing touch sensitivity from being reduced by the parasitic capacitance.

Without the touch buffer film T-BUF, the touch sensor metal TSM comprising the X and Y-touch electrodes X-TE and Y-TE and the X and Y-touch electrode connecting lines X-CL and Y-CL can be disposed on the encapsulation layer ENCAP.

In addition, the touch buffer film T-BUF can prevent or reduce the emitting layer EL containing the organic material from being penetrated by a chemical agent (e.g. a developing solution or an etching solution) used in fabrication processing of the touch sensor metal TSM disposed on the touch buffer film T-BUF, external moisture, or the like. Accordingly, the touch buffer film T-BUF can prevent the emitting layer EL vulnerable to the chemical agent or moisture from being damaged.

The touch buffer film T-BUF is made of an organic insulating material producible at a low temperature equal to or lower than a predetermined temperature (e.g., 100° C.) and having a low dielectric constant of 1 to 3 in order to prevent the emitting layer EL containing the organic material vulnerable to high temperature from being damaged. For example, the touch buffer film T-BUF can be made of an epoxy-based material or a siloxane-based material. The touch buffer film T-BUF made of an inorganic insulating material and having a planarization performance can prevent the layers PAS1, PCL, and PAS2 included in the encapsulation layer ENCAP from being damaged or the touch sensor metal TSM on the touch buffer film T-BUF from being fractured in response to the bending of the OLED display device.

According to the mutual capacitance-based touch sensor structure, the X-touch electrode lines X-TEL and the Y-touch electrode lines Y-TEL are disposed on the touch buffer film T-BUF, and the X-touch electrode lines X-TEL and the Y-touch electrode lines Y-TEL can be disposed such that the X-touch electrode lines X-TEL intersect the Y-touch electrode lines Y-TEL.

The Y-touch electrode lines Y-TEL can comprise the plurality of Y-touch electrodes Y-TE and the plurality of Y-touch electrode connecting lines Y-CL electrically connecting the plurality of Y-touch electrodes Y-TE.

As illustrated in FIG. 9, the plurality of Y-touch electrodes Y-TE and the plurality of Y-touch electrode connecting lines Y-CL can be disposed on different layers, on both sides of a touch insulating film T-ILD.

The plurality of Y-touch electrodes Y-TE can be spaced apart from each other by predetermined distances in the Y-axis direction. Each of the plurality of Y-touch electrodes Y-TE can be electrically connected to the other adjacent Y-touch electrodes Y-TE through the Y-touch electrode connecting lines Y-CL in the Y-axis direction.

The Y-touch electrode connecting lines Y-CL can be provided on the touch buffer film T-BUF and exposed through touch contact holes extending through the touch insulating film T-ILD to be electrically connected to the two adjacent Y-touch electrodes Y-TE in the Y-axis direction.

The Y-touch electrode connecting lines Y-CL can be disposed to overlap the banks BANK. Accordingly, the aperture ratio can be prevented from being reduced by the Y-touch electrode connecting lines Y-CL.

The X-touch electrode lines X-TEL can comprise the plurality of X-touch electrodes X-TE and the plurality of X-touch electrode connecting lines X-CL electrically connecting the plurality of X-touch electrodes X-TE. The plurality of X-touch electrodes X-TE and the plurality of X-touch electrode connecting line X-CL can be disposed on different layers, on both sides of the touch insulating film T-ILD.

The plurality of X-touch electrodes X-TE can be disposed on the touch insulating film T-ILD, spaced apart from each other by predetermined distances in the X-axis direction. Each of the plurality of X-touch electrodes X-TE can be electrically connected to the adjacent other X-touch electrodes X-TE through the X-touch electrode connecting lines X-CL in the X-axis direction.

The X-touch electrode connecting lines X-CL can be disposed on the same plane as the X-touch electrodes X-TE to be electrically connected to the two adjacent X-touch electrodes X-TE in the X-axis direction without separate contact holes or be integrated with the two adjacent X-touch electrodes X-TE in the X-axis direction.

The X-touch electrode connecting lines X-CL can be disposed to overlap the banks BANK. Accordingly, the aperture ratio can be prevented from being decreased by the X-touch electrode connecting lines X-CL.

In addition, the Y-touch electrode lines Y-TEL can be electrically connected to the touch driving circuit TDC through the Y-touch routing lines Y-TL and the Y-touch pads Y-TP. In the same manner, the X-touch electrode lines X-TEL can be electrically connected to the touch driving circuit TDC through the X-touch routing lines X-TL and the X-touch pads X-TP.

A pad cover electrode covering the X-touch pads X-TP and the Y-touch pads Y-TP can be further disposed.

The X-touch pads X-TP can be provided separately from the X-touch routing lines X-TL or be provided as extensions of the X-touch routing lines X-TL. The Y-touch pads Y-TP can be provided separately from the Y-touch routing lines Y-TL or be provided as extensions of the Y-touch routing lines Y-TL.

In a case in which the X-touch pads X-TP are extensions of the X-touch routing lines X-TL and the Y-touch pads Y-TP are extensions of the Y-touch routing lines Y-TL, the X-touch pads X-TP, the X-touch routing lines X-TL, the Y-touch pads Y-TP, and the Y-touch routing lines Y-TL can be comprised of the same material, i.e., a first conductive material. The first conductive material can have a single or multilayer structure made of a metal, such as Al, Ti, Cu, or Mo, having high corrosion resistance, high acid resistance, and high conductivity.

For example, each of the X-touch pads X-TP, the X-touch routing lines X-TL, the Y-touch pads Y-TP, and the Y-touch routing lines Y-TL comprised of the first conductive material can have a three-layer structure, such as Ti/Al/Ti or Mo/Al/Mo.

The pad cover electrode capable of covering the X-touch pads X-TP and the Y-touch pads Y-TP can be comprised of the same material as the X and Y-touch electrodes X-TE and Y-TE, i.e. a second conductive material. The second conductive material can be a transparent conductive material, such as indium tin oxide (ITO) or indium zinc oxide (IZO), having high corrosion resistance and acid resistance. The pad cover electrodes can be provided to be exposed from the touch buffer film T-BUF so as to be bonded to the touch driving circuit TDC or to a circuit film on which the touch driving circuit TDC is mounted.

The touch buffer film T-BUF can be provided to cover the touch sensor metal TSM so as to prevent the touch sensor metal TSM from being corroded by external moisture. For example, the touch buffer film T-BUF can be made of an organic insulating material or be provided as a circular polarizer or a film made of an epoxy or acrylic material. The touch buffer film T-BUF may not be provided on the encapsulation layer ENCAP. That is, the touch buffer film T-BUF may not be an essential component.

The Y-touch routing lines Y-TL can be electrically connected to the Y-touch electrodes Y-TE via touch routing line contact holes or be integrated with the Y-touch electrodes Y-TE.

Each of the Y-touch routing lines Y-TL can extend to the non-active area NA, past the top and side portions of the encapsulation layer ENCAP and the dams DAM, so as to be electrically connected to the Y-touch pads Y-TP. Accordingly, the Y-touch routing lines Y-TL can be electrically connected to the touch driving circuit TDC through the Y-touch pads Y-TP.

The Y-touch routing lines Y-TL can deliver the touch-sensing signal from the Y-touch electrodes Y-TE to the touch driving circuit TDC or deliver the touch driving signal, received from the touch driving circuit TDC, to the Y-touch electrodes Y-TE.

The X-touch routing lines X-TL can be electrically connected to the X-touch electrodes X-TE via the touch routing line contact holes or be integrated with the X-touch electrodes X-TE.

The X-touch routing lines X-TL can extend to the non-active area NA, past the top and side portions of the encapsulation layer ENCAP and the dams DAM, so as to be electrically connected to the X-touch pads Y-TP. Accordingly, the X-touch routing lines X-TL can be electrically connected to the touch driving circuit TDC through the X-touch pads X-TP.

The X-touch routing lines X-TL can deliver the touch driving signal, received from the touch driving circuit TDC, to the X-touch electrodes X-TE or deliver touch-sensing signal from the X-touch electrodes X-TE to the touch driving circuit TDC.

The arrangement of the X-touch routing lines X-TL and the Y-touch routing lines Y-TL can be modified variously depending on the design specification of the panel.

A touch protective film PAC can be disposed on the X-touch electrodes X-TE and the Y-touch electrodes Y-TE. The touch protective film PAC can extend to an area in front of or behind the dams DAM so as to be disposed on the X-touch routing lines X-TL and the Y-touch routing lines Y-TL.

The cross-sectional diagram of FIG. 9 is conceptual illustration of the structure. The positions, thicknesses, or widths of the patterns (e.g., various layers or electrodes) can vary depending on the direction or position of view, the structures for connecting the patterns can be modified, additional layers other than the plurality of illustrated layers can be further provided, and some of the plurality of illustrated layers can be omitted or integrated. For example, the width of the banks BANK can be narrower than that illustrated in the drawings, and the height of the dams DAM can be lower or higher than that illustrated in the drawings. In addition, the cross-sectional diagram of FIG. 9 illustrates a structure in which the touch electrode TE, the touch routing lines TL, and the like are disposed on the entirety of the subpixels SP in order to illustrate a structure connected to the touch pads TP along inclines of the touch routing lines TL and the encapsulation layer ENCAP. However, in a case in which the touch electrode TE or the like is mesh-shaped as described above, the open areas OA of the touch electrode TE can be located above the emitting areas of the subpixels SP. In addition, a color filter CF (see FIGS. 10 and 11) can be further disposed on the encapsulation layer ENCAP. The color filter CF can be located on the touch electrode TE or between the encapsulation layer ENCAP and the touch electrode TE.

Figure 10:
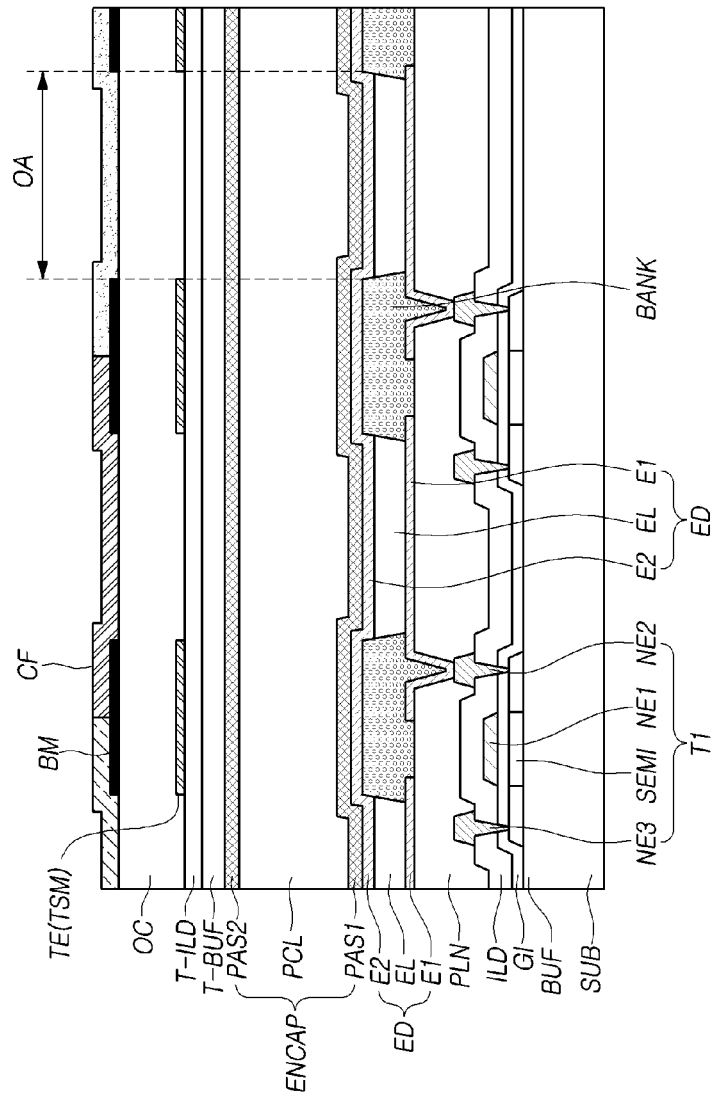
FIGS. 10 and 11 are diagrams illustrating a cross-sectional structure of a display panel including a color filter according to embodiments of the present disclosure.
Figure 11:
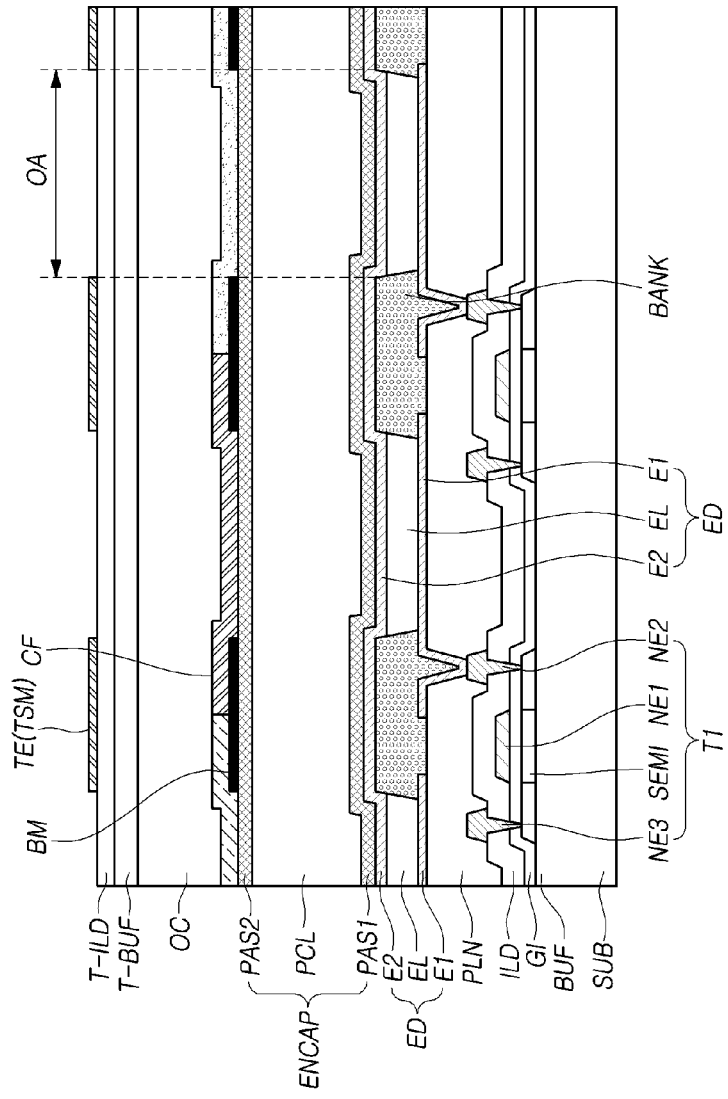

FIGS. 10 and 11 are diagrams illustrating a cross-sectional structure of the display panel DISP according to embodiments of the present disclosure, including the color filter CF.

Referring to FIGS. 10 and 11, in a case in which the touch panel TSP is disposed within the display panel DISP and the display panel DISP is provided as an OLED display panel, the touch panel TSP can be located on the encapsulation layer ENCAP in the display panel DISP. That is, the touch sensor metals TSM, such as the plurality of touch electrodes TE and the plurality of touch routing lines TL, can be located on the encapsulation layer ENCAP in the display panel DISP.

The touch electrode TE being provided on the encapsulation layer ENCAP as described above can be made as the touch electrode TE without significantly influencing the display performance or the formation of a display-related layer.

Referring to FIGS. 10 and 11, the second electrode E2 that can be the cathode of the OLED can be located below the encapsulation layer ENCAP.

The thickness T of the encapsulation layer ENCAP can be, for example, 1 μm or more.

Since the thickness of the encapsulation layer ENCAP is designed to be 1 μm or more as described above, parasitic capacitance generated between the second electrode E2 and the touch electrodes TE of the OLED can be reduced, thereby preventing touch sensitivity from being reduced by the parasitic capacitance.

As described above, each of the plurality of touch electrodes TE is patterned in the shape of a mesh, in which the electrode metal EM has two or more open areas OA. Each of the two or more open areas OA can correspond to one or more subpixels or the emitting areas thereof when viewed in a vertical direction.

As described above, the electrode metal EM of the touch electrode TE can be patterned such that the emitting area of one or more subpixels SP is provided in a position corresponding to each of the two or more open areas OA present in the area of the touch electrode TE when viewed in a plan view. Accordingly, the luminous efficiency of the display panel DISP can be improved.

As illustrated in FIGS. 10 and 11, a black matrix BM can be provided in the display panel DISP. The color filter CF can be further provided in the display panel DISP.

The position of the black matrix BM can correspond to the position of the electrode metal EM of the touch electrode TE.

The positions of the plurality of color filters CF correspond to the positions of the plurality of touch electrodes TE or the position of the electrode metal EM constituting the plurality of touch electrodes TE.

Since the plurality of color filters CF are located in positions corresponding to the plurality of open areas OA as described above, the luminous performance of the display panel DISP can be improved.

The vertical positional relationship between the plurality of color filters CF and the plurality of touch electrodes TE will be described as follows.

As illustrated in FIG. 10, the plurality of color filters CF and the black matrix BM can be located on the plurality of touch electrodes TE.

In this case, the plurality of color filters CF and the black matrix BM can be located on the overcoat layer OC disposed on the plurality of touch electrodes TE. Here, the overcoat layer OC can be the same layer as or a different layer from the touch protective film PAC illustrated in FIG. 9.

Alternatively, as illustrated in FIG. 11, the plurality of color filters CF and the black matrix BM can be located below the plurality of touch electrodes TE.

In this case, the plurality of touch electrodes TE can be located on the overcoat layer OC on the plurality of color filters CF and the black matrix BM. The overcoat layer OC can be the same layer as or a different layer from the touch buffer film T-BUF or the touch insulating film T-ILD illustrated in FIG. 9. Alternatively, the touch buffer film T-BUF or the touch insulating film T-ILD can be disposed in a manner separate from the overcoat layer OC.

Due to the vertical positional relationship between the touch electrode TE and a display driving configuration being adjusted as described above, a touch sensing configuration can be disposed without degrading the display performance.

Furthermore, by arranging the touch routing line TL electrically connected to the touch electrode TE as various structures, an area required for arranging the touch routing line TL can be reduced, and a performance of a touch sensing can be improved by reducing an influence that a load of the touch routing line TL affect the touch sensing.

FIGS. 12A to 12D are diagrams schematically illustrating examples of a structure of the touch electrode line TEL and the touch routing line TL disposed in the display panel DISP according to embodiments of the present disclosure.

Figure 12A:
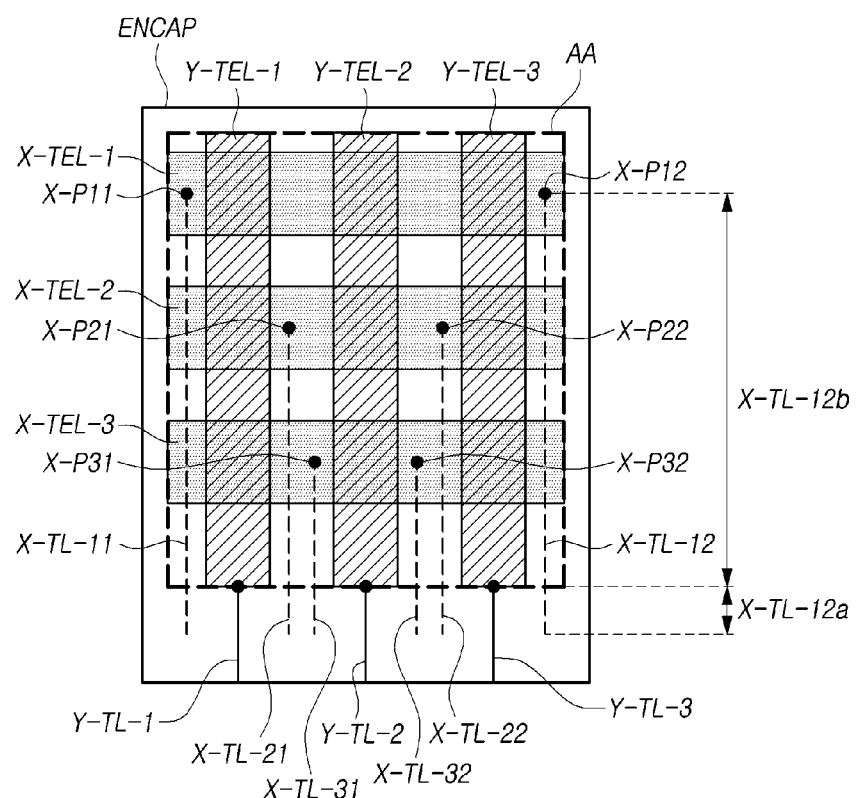
FIGS. 12A to 12D are diagrams schematically illustrating examples of a structure of a touch electrode line and a touch routing line disposed in a display panel according to embodiments of the present disclosure.

Referring to FIG. 12A, the plurality of X-touch electrode lines X-TEL and the plurality of Y-touch electrode lines Y-TEL are be disposed on the active area AA on the encapsulation layer ENCAP. FIG. 12A illustrates a structure that three X-touch electrode lines X-TEL and three Y-touch electrode lines Y-TEL are disposed as an example.

The X-touch electrode line X-TEL can comprise two or more X-touch electrodes X-TE disposed on the active area AA. The two or more X-touch electrodes X-TE can be electrically connected to each other along the first direction (e.g., row direction).

The Y-touch electrode line Y-TEL can comprise two or more Y-touch electrodes Y-TE disposed on the active area AA. The two or more Y-touch electrodes Y-TE can be electrically connected to each other along the second direction (e.g., column direction).

FIG. 12A illustrates schematically a structure of the touch electrode line TEL comprising the plurality of touch electrodes TE, the touch electrode TE included in the touch electrode line TEL can be the rhombus shape, or the rectangular shape such as an example described above.

The plurality of touch routing lines TL can be disposed to be electrically connected to one touch electrode line TEL of the plurality of X-touch electrode lines X-TEL and the plurality of Y-touch electrode lines Y-TEL.

At least a portion of the touch routing line TL can be located on the encapsulation layer ENCAP.

Furthermore, at least a portion of the touch routing line TL can be located on the active area AA on the encapsulation layer ENCAP.

As at least a portion of the touch routing line TL is located on the active area AA to be electrically connected to the touch electrode line TEL, an increase of the non-active area NA due to an arrangement of the touch routing line TL can be reduced.

As reducing the increase of the non-active area NA due to the arrangement of the touch routing line TL, the touch routing line TL can be disposed additionally. Furthermore, as increasing a number of the touch routing line TL electrically connected to the touch electrode line TEL, the load of the touch routing line TL can be reduced, and a drop of the performance of the touch sensing according to the load of the touch routing line TL can be reduced by reducing the load of the touch routing line TL.

That is, at least one touch electrode line TEL of the plurality of X-touch electrode lines X-TEL and the plurality of Y-touch electrode lines Y-TEL can be electrically connected to two or more touch routing lines TL. And at least a portion of the touch routing line TL electrically connected to the touch electrode line TEL can be located on the active area AA.

For example, each of the plurality of Y-touch electrode lines Y-TEL of the plurality of X-touch electrode lines X-TEL and the plurality of Y-touch electrode lines Y-TEL can be electrically connected to one Y-touch routing line Y-TL. The Y-touch routing line Y-TL isn't disposed on the active area, and can be disposed on the non-active area NA.

Each of the plurality of X-touch electrode lines X-TEL can be electrically connected to two or more X-touch routing lines X-TL.

For example, a first X-touch electrode line X-TEL-1 can be electrically connected to a first line X-TL-11 of a first X-touch routing line X-TL-1 and a second line X-TL-12 of the first X-touch routing line X-TL-1.

At least a portion of the first line X-TL-11 and the second line X-TL-12 can be disposed on the active area AA.

Explaining the second line X-TL-12 as an example, a first part X-TL-12a of the second line X-TL-12 can be located on the non-active area NA on the encapsulation layer ENCAP. And a second part X-TL-12b of the second line X-TL-12 can be located on the active area AA on the encapsulation layer ENCAP.

The second part X-TL-12b of the second line X-TL-12 can be disposed on a same layer as the X-touch electrode line X-TEL, at least one insulation layer such as the touch insulation film T-ILD or the touch buffer film T-BUF can be located between the second part X-TL-12b of the second line X-TL-12 and the encapsulation layer ENCAP.

As a portion of the touch routing line TL is located on the active area AA, a number of the touch routing lines TL electrically connected to the touch electrode line TEL can increase since the increase of the non-active area NA due to the arrangement of the touch routing line TL can be reduced Thus, by reducing the load by the touch routing line TL, reduction of the performance of the touch sensing is reduced by the load of the touch routing line TL.

Furthermore, since the touch electrode line TEL is electrically connected to the touch routing line TL at a plurality of points, a degree that a touch sensing sensitivity is reduced depending on a position of the touch electrode line TEL can be reduced, or a difference of the touch sensing sensitivity can be reduced.

For example, the first X-touch electrode line X-TEL-1 can be electrically connected to the first line X-TL-11 of the first X-touch routing line X-TL-1 on a first point X-P11 inside the active area AA. Furthermore, the first X-touch electrode line X-TEL-1 can be electrically connected to the second line X-TL-12 of the first X-touch routing line X-TL-1 on a second point X-P12 inside the active area AA.

A distance between the first point X-P11 and the second point X-P12 can be smaller than a distance between both ends of the first X-touch electrode line X-TEL-1.

Thus, the longest path which the touch driving signal is supplied from the touch driving circuit TDC or the touch sensing signal is detected can be short, a degree that the touch sensing sensitivity is dropped at a point where a signal transmission path is the longest in the X-touch electrode line X-TEL can be reduced.

Furthermore, by varying a point where the X-touch routing line X-TL is connected for each X-touch electrode line X-TEL, the difference of the touch sensing sensitivity can be reduced while reducing the drop of the touch sensing sensitivity.

For example, a second X-touch electrode line X-TEL-2 can be electrically connected to a first line X-TL-21 of a second X-touch routing line X-TL-2 and a second line X-TL-22 of the second X-touch routing line X-TL-2 on the active area AA.

The second X-touch electrode line X-TEL-2 can be electrically connected to the first line X-TL-21 at a first point X-P21, and can be electrically connected to the second line X-TL-22 at a second point X-P22.

A distance between the first point X-P21 and the second point X-P22 where the second X-touch electrode line X-TEL-2 is electrically connected to the second X-touch routing line X-TL-2 can be smaller than a distance between two points where the first X-touch electrode line X-TEL-1 is electrically connected to the first X-touch routing line X-TL-1.

Thus, by reducing a distance to a point where a signal transmission path is the longest in the second X-touch electrode line X-TEL-2, a degree that the touch sensing sensitivity is dropped can be reduced more comparing to the first X-touch electrode line X-TEL-1.

As a point where the touch sensing sensitivity is the lowest in the second X-touch electrode line X-TEL-2 is not located on a same line with a point where the touch sensing sensitivity is the lowest in the first X-touch electrode line X-TEL-1, it can be prevented that the touch sensing sensitivity is dropped in a certain touch electrode line TEL.

A third X-touch electrode line X-TEL-3 can be electrically connected to a first line X-TL-31 of a third X-touch routing line X-TL-3 at a first point X-P31, and can be electrically connected to a second line X-TL-32 of the third X-touch routing line X-TL-3 at a second point X-P32.

A distance between two points where the third X-touch electrode line X-TEL-3 is connected to the third X-touch routing line X-TL-3 can be different from a distance between two points where the second X-touch electrode line X-TEL-2 is connected to the second X-touch routing line X-TL-2 and a distance between two points where the first X-touch electrode line X-TEL-1 is connected to the first X-touch routing line X-TL-1.

As described above, by adjusting a point that each of the plurality X-touch electrode lines X-TEL is connected to the plurality of X-touch routing lines X-TL and a distance between the points, a degree that the sensitivity of the touch sensing is dropped depending on positions in the X-touch electrode line X-TEL can be reduced, and the performance of the touch sensing can be improved.

Alternatively, as making a distance between points where the touch electrode line TEL is connected to the plurality of touch routing line TL to be same or be included within a similar range, a sensitivity difference of the touch sensing can be reduced while minimizing a sensitivity drop of the touch sensing.

Figure 12B:
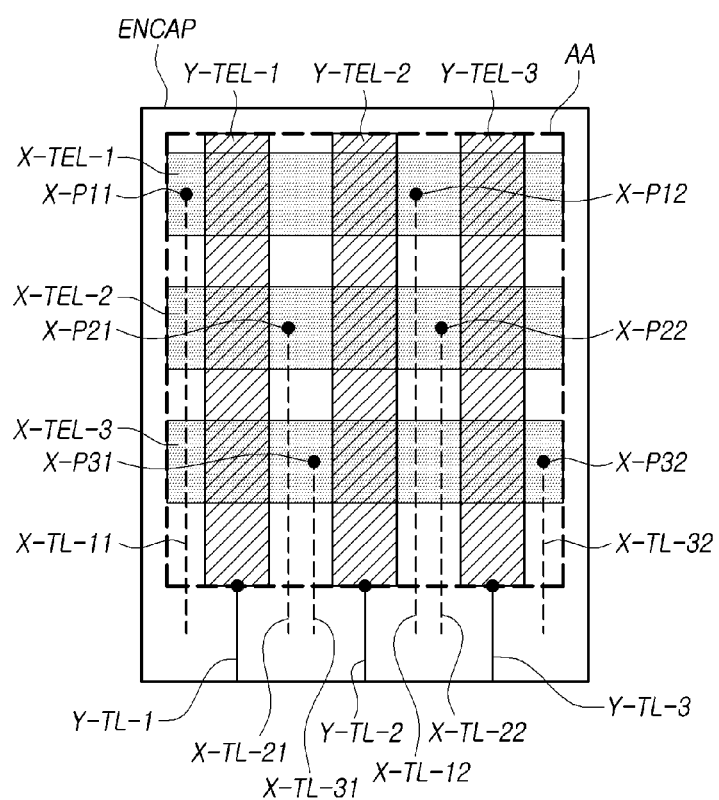

Referring to FIG. 12B, similarly to an example illustrated in FIG. 12A, each of the plurality of Y-touch electrode lines Y-TEL is electrically connected to one Y-touch routing line Y-TL. And each of the plurality of X-touch electrode lines X-TEL is electrically connected to two X-touch routing lines X-TL.

A point where the X-touch electrode line X-TEL is electrically connected to the X-touch routing line X-TL can be located as a specific pattern on the active area AA.

Thus, a distance between two points where each of the first X-touch electrode line X-TEL-1, the second X-touch electrode line X-TEL-2 and the third X-touch electrode line X-TEL-3 is connected to the X-touch routing line X-TL can be same, or similar.

As the plurality of X-touch routing lines X-TL is disposed on the active area AA and is electrically connected to the X-touch electrode line X-TEL, a load by the X-touch routing line X-TL can be reduced while reducing an increase of an area according to additional arrangement of the X-touch routing line X-TL.

As a distance between points where each X-touch electrode line X-TEL is electrically connected to the X-touch routing line X-TL is same or similar, a degree that the sensitivity of the touch sensing is dropped at a point where the sensitivity of the touch sensing is the weakest in each X-touch electrode line X-TEL can be similar.

Thus, while reducing a degree that the sensitivity of the touch sensing is dropped in each X-touch electrode line X-TEL, a difference of the sensitivity of the touch sensing depending on a position of each X-touch electrode line X-TEL can be reduced, and an uniformity of the touch sensing can be improved.

Furthermore, in some cases, each of the plurality of X-touch electrode lines X-TEL can be electrically connected to one X-touch routing line X-TL, and each of the plurality of Y-touch electrode lines Y-TEL can be electrically connected to the plurality of Y-touch routing lines Y-TL.

In this case, a portion of the Y-touch routing line Y-TL can be located on the active area AA.

Figure 12C:
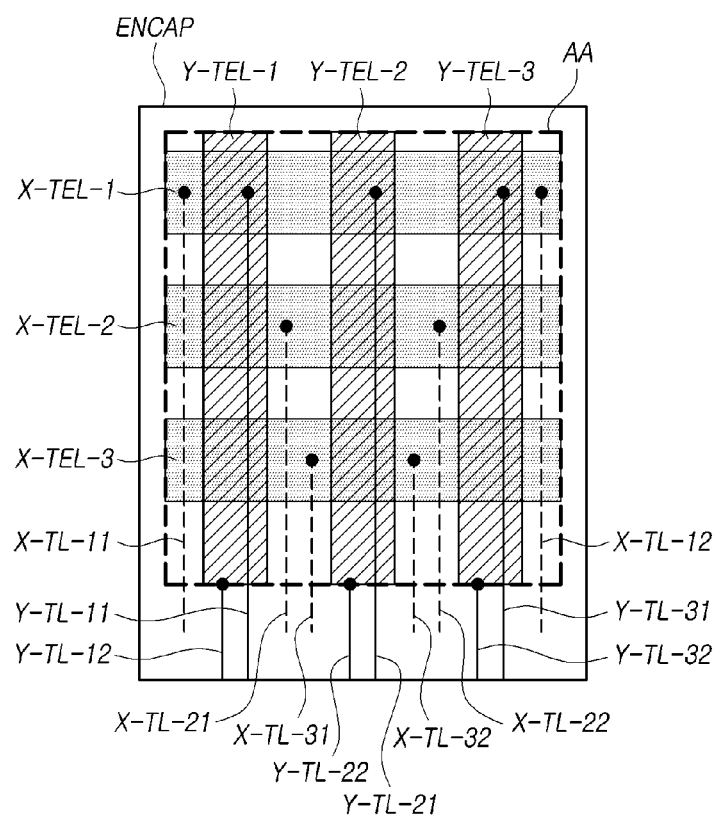

Alternatively, each of the plurality of X-touch electrode lines X-TEL and the plurality of Y-touch electrode lines Y-TEL can be electrically connected to the plurality of touch routing lines TL at least partially disposed on the active area AA Referring to FIG. 12C, each of the plurality X-touch electrode line X-TEL can be electrically connected to the plurality of X-touch routing lines X-TL. At least a portion of the plurality of X-touch routing lines X-TL can be disposed on the active area AA.

Thus, the X-touch electrode line X-TEL can be electrically connected to the X-touch routing line X-TL on the active area AA.

Each of the plurality of Y-touch electrode lines Y-TEL can be electrically connected to the plurality of Y-touch routing lines Y-TL. A portion of at least one of the plurality of Y-touch routing lines Y-TL can be disposed on the active area AA. And at least one of the plurality of Y-touch routing lines Y-TL can be disposed only on the non-active area NA.

Thus, the Y-touch electrode line Y-TEL can be electrically connected to at least one of the plurality of Y-touch routing lines Y-TL on the active area, and can be electrically connected to at least one of the plurality of Y-touch routing lines Y-TL on a boundary of the active area AA or on the non-active area NA.

As all of the X-touch electrode line X-TEL and the Y-touch electrode line Y-TEL are electrically connected to the plurality of touch routing lines TL and at least a portion of the plurality of touch routing lines TL are disposed on the active area AA, the performance of the touch sensing can be improved by reducing the load of the touch routing line TL while minimizing an increase of an area due to an arrangement of the touch routing line TL.

Figure 12D:
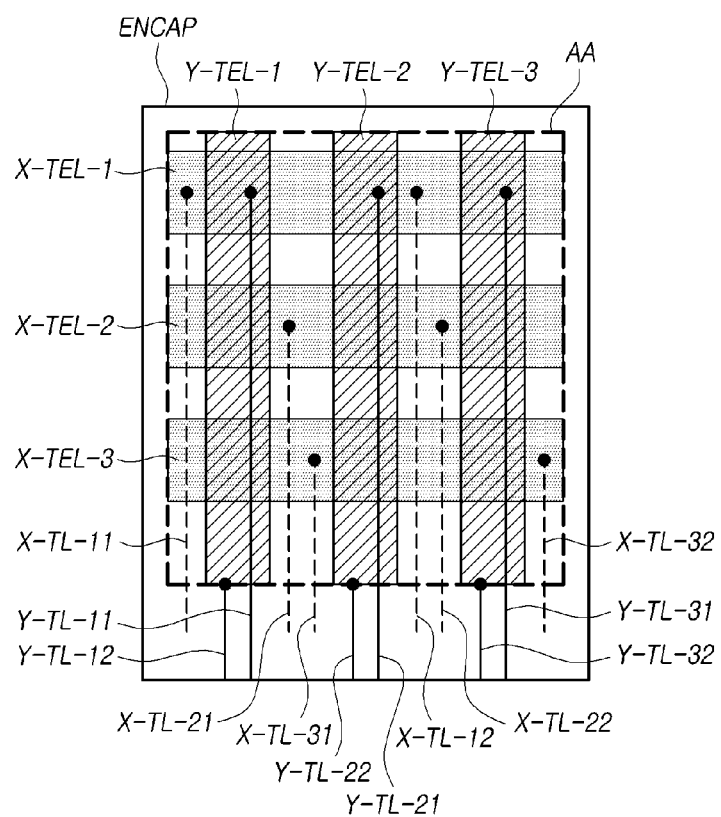

Furthermore, distances between points where one touch electrode line TEL and the plurality of touch routing lines TL are connected on the active area AA can be different each other such as an example illustrated in FIG. 12C, or can be constant or similar such as an example illustrated in FIG. 12D.

Such as the example illustrated in FIG. 12D, as one touch electrode line TEL is electrically connected to the plurality of touch routing lines TL and the distances between points connected to the plurality of touch routing lines TL are constant or similar, a difference of the sensitivity of the touch sensing depending on a position of the touch electrode line TEL can be reduced and an uniformity of the touch sensing can be improved.

Furthermore, a portion of the touch routing line TL disposed on the active area AA can be located in an area of the touch electrode line TEL which the touch routing line TL is electrically connected.

Thus, in a case that the touch routing line TL is disposed on the active area AA, a noise by the touch electrode line TEL connected to the touch routing line TL and the touch electrode line TEL being supplied a different signal can be prevented.

Figure 13A:
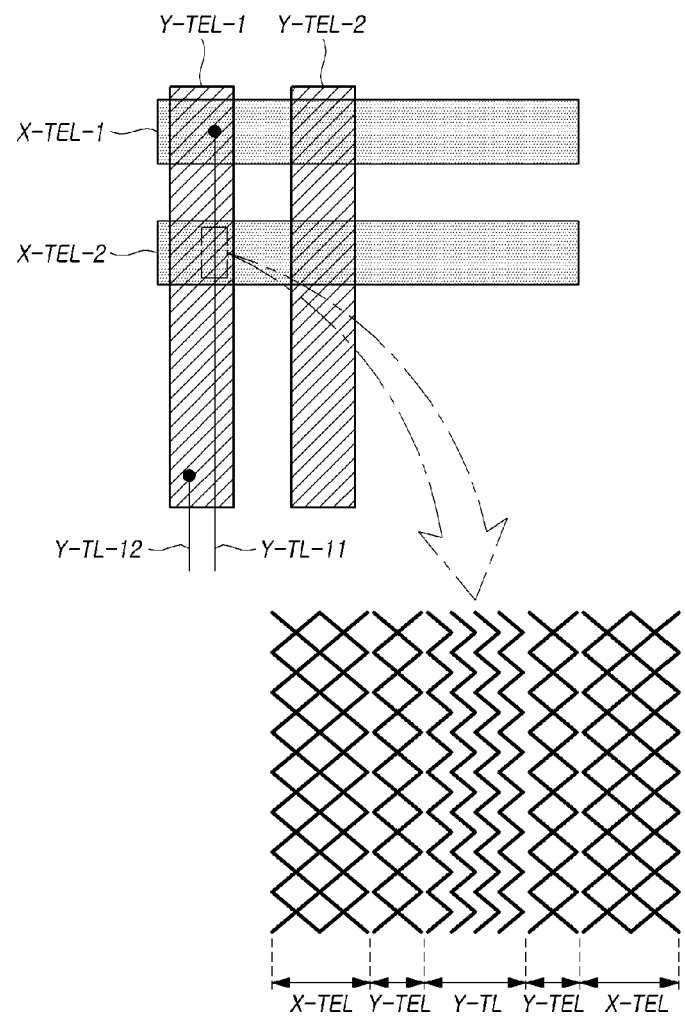
FIGS. 13A to 13C are diagrams illustrating examples of a specific structure of a touch electrode line and a touch routing line disposed in a display panel according to embodiments of the present disclosure.
Figure 13B:
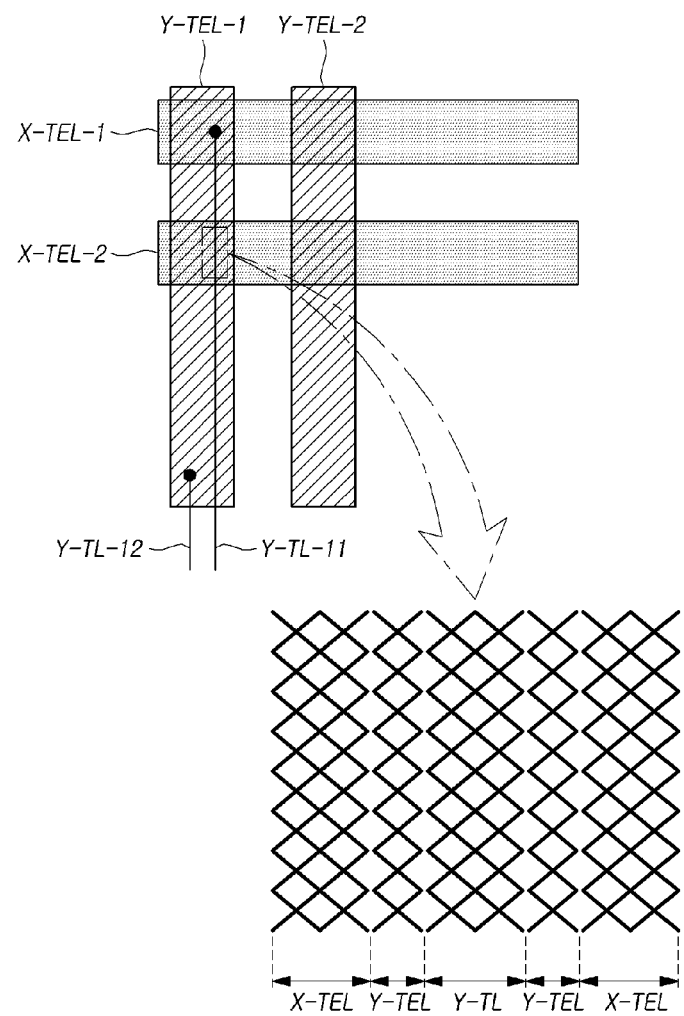
Figure 13C:
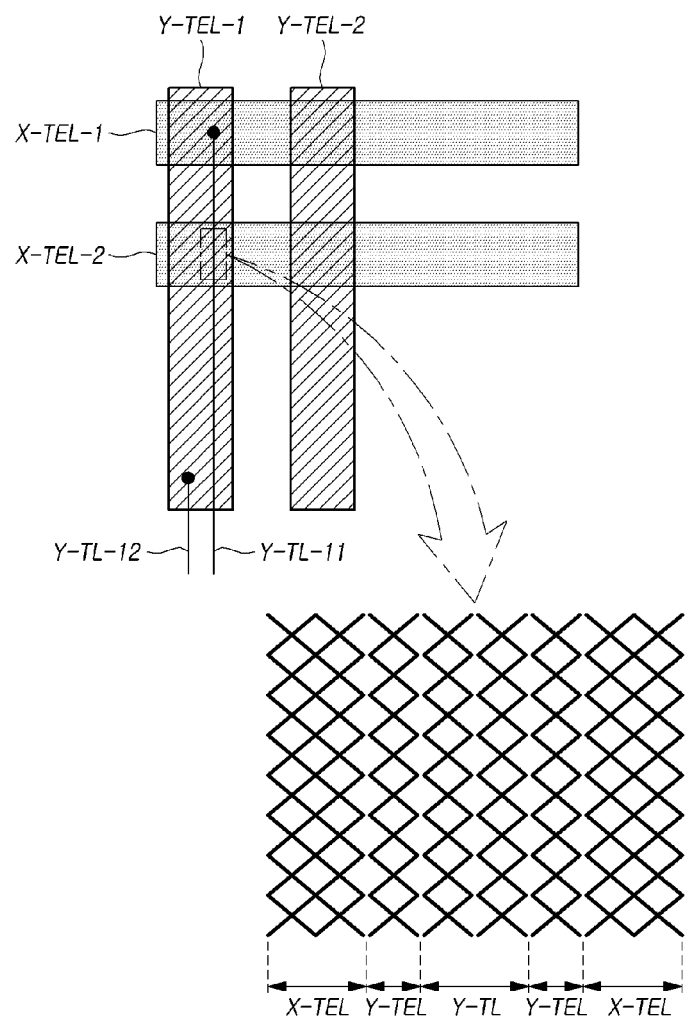

FIGS. 13A to 13C are diagrams illustrating examples of a specific structure of the touch electrode line TEL and the touch routing line TL disposed in the display panel DISP according to embodiments of the present disclosure.

Referring to FIG. 13A, in a structure that the plurality of X-touch electrode lines X-TEL and the plurality of Y-touch electrode liens Y-TEL are disposed to be crossed (e.g., intersect in a plan view), an example of a structure that the plurality of Y-touch routing lines Y-TL is connected to the Y-touch electrode line Y-TEL is illustrated.

A first Y-touch electrode line Y-TEL-1 can be electrically connected to a first Y-touch routing line Y-TL-11 and a second Y-touch routing line Y-TL-12.

The first Y-touch electrode line Y-TEL-1 can be electrically connected to the first Y-touch routing line Y-TL-11 on a point adjacent to an upper side, and can be electrically connected to the second Y-touch routing line Y-TL-12 on a point adjacent to a lower side.

As the first Y-touch routing line Y-TL-11 is electrically connected to the first Y-touch electrode line Y-TEL-1 on a point adjacent to an upper side of the first Y-touch electrode line Y-TEL-1, at least a portion of the first Y-touch routing line Y-TL-1 can be located on an area where the touch electrode line TEL is disposed on the active area AA.

At least a portion of the first Y-touch routing line Y-TL-11 can be located on an area surrounded by the first Y-touch electrode line Y-TEL-1 electrically connected to the first Y-touch routing line Y-TL-11.

Referring to an example of a structure enlarging an area where the first Y-touch electrode line Y-TEL-1 and the second X-touch electrode line X-TEL-2 cross each other, the touch electrode TE can be a rectangular shape and can comprise a pattern of a mesh shape. The X-touch electrode X-TE included in the X-touch electrode line X-TEL can be connected by the connecting line CL (not illustrated) located on a different layer from the X-touch electrode X-TE. The Y-touch electrode Y-TE included in the Y-touch electrode line Y-TEL can be connected by the connecting line CL (not illustrated) located on a same layer as the Y-touch electrode Y-TE.

Here, the Y-touch routing line Y-TL connected on a point adjacent to an upper side of the Y-touch electrode line Y-TEL can be disposed on a same layer as the Y-touch electrode line Y-TEL and can be located on an area surrounded by the Y-touch electrode line Y-TEL. Thus, the Y-touch routing line Y-TL can be disposed to be apart from the X-touch electrode line X-TEL by the Y-touch electrode line Y-TEL.

As the Y-touch routing line Y-TL is disposed on an area surrounded by the Y-touch electrode line Y-TEL, even if the Y-touch routing line Y-TL is disposed on the active area AA, noise generated to the Y-touch routing line Y-TL by the X-touch electrode line X-TEL being supplied a different signal is reduced.

That is, by disposing the touch routing line TL on an area surrounded by the touch electrode line TEL electrically connected to the touch routing line TL on active area AA, the touch routing line TL can be disposed on the active area AA while reducing a noise by the touch electrode line TEL being supplied a different signal.

Alternatively, the touch routing line TL can be disposed on the active area AA, and can be disposed on an area surrounded by the touch electrode line TEL being supplied a same signal as a signal supplied to the touch electrode line TEL electrically connected to the touch routing line TL.

For example, in a case that the X-touch routing line X-TL electrically connected to the X-touch electrode line X-TEL is disposed on the active area AA, a portion of the X-touch routing line X-TL can be disposed on an area surrounded by the X-touch electrode line X-TEL which the X-touch routing line X-TL is not electrically connected.

As described above, as the touch routing line TL is located on an area surrounded by the touch electrode line TEL which a same signal is supplied, a noise generation according to an arrangement of the touch routing line TL on the active area AA can be prevented.

The touch routing line TL disposed on an area surrounded by the touch electrode line TEL, such as an example illustrated in FIG. 13A, can be a line shape corresponding to a shape of an outer line of the touch electrode line TEL.

As the touch routing line TL is disposed as the line shape so that an area of the touch routing line TL is reduced, a parasitic capacitance made between the touch routing line TL and a peripheral electrode can be reduced.

Alternatively, the touch routing line TL, such as an example illustrated in FIG. 13B, can comprise a same pattern as a pattern included in the touch electrode line TEL.

As the touch routing line TL disposed on an area surrounded by the touch electrode line TEL has a same pattern as the touch electrode line TEL, the touch routing line TL can be implemented on the active area AA easily by a cutting process after arranging the touch sensor metal TSM having a specific pattern. Furthermore, since the touch electrode line TEL and the touch routing line TL have a same pattern, the touch routing line TL disposed on the active area AA may not be visually recognized.

Alternatively, such as an example illustrated in FIG. 13C, the touch routing line TL can be separated as two or more on an area surrounded by the touch electrode line TEL.

As two or more touch routing line TL is disposed on an area surrounded by the touch electrode line TEL, a structure that the touch electrode line TEL and the touch routing line TL are electrically connected on a plurality of points on the active area AA can be implemented.

Furthermore, in the example described above, an auxiliary touch routing line electrically connected to the touch routing line TL can be disposed between the touch routing line TL and the encapsulation layer ENCAP.

The auxiliary touch routing line can be disposed on a different layer from the touch electrode TE and can be disposed on a same layer as the connecting line CL electrically connecting the touch electrode TE. As the auxiliary touch routing line is disposed on a same layer as the connecting line CL, the auxiliary touch routing line can be disposed on an area except for an area where the X-touch electrode line X-TEL and the Y-touch electrode line Y-TEL cross each other.

That is, the auxiliary touch routing line reducing a resistance of the touch routing line TL can be implemented by using a same metal as the connecting line CL on an area where the connecting line CL electrically connecting the touch electrode TE each other is not disposed on a different layer from a layer where the touch electrode TE is disposed.

The auxiliary touch routing line can be a same shape as the touch routing line TL, or can be a different shape from the touch routing line TL.

As described above, according to embodiments of the present disclosure, as disposing at least some of the plurality of touch routing lines TL electrically connected to the touch electrode line TEL on an area surrounded by the touch electrode line TEL on the active area AA, an arrangement structure of the touch routing line TL can be provided to be capable to improving the performance of the touch sensing while preventing a noise by the touch electrode line TEL being supplied a different signal.

Furthermore, as disposing the auxiliary touch routing line on an area where the connecting line CL is not disposed by using a same metal as the connecting line CL disposed on a different layer from the touch electrode TE, the resistance of the touch routing line TL disposed on the active area AA can be further reduced.

Furthermore, according to embodiments of the present disclosure, by implementing the touch electrode line TEL disposed on the active area AA as a separated structure and connecting the plurality of touch routing lines TL, the load by the touch routing line TL can be further reduced and the sensitivity of the touch sensing can be enhanced.

Figure 14:
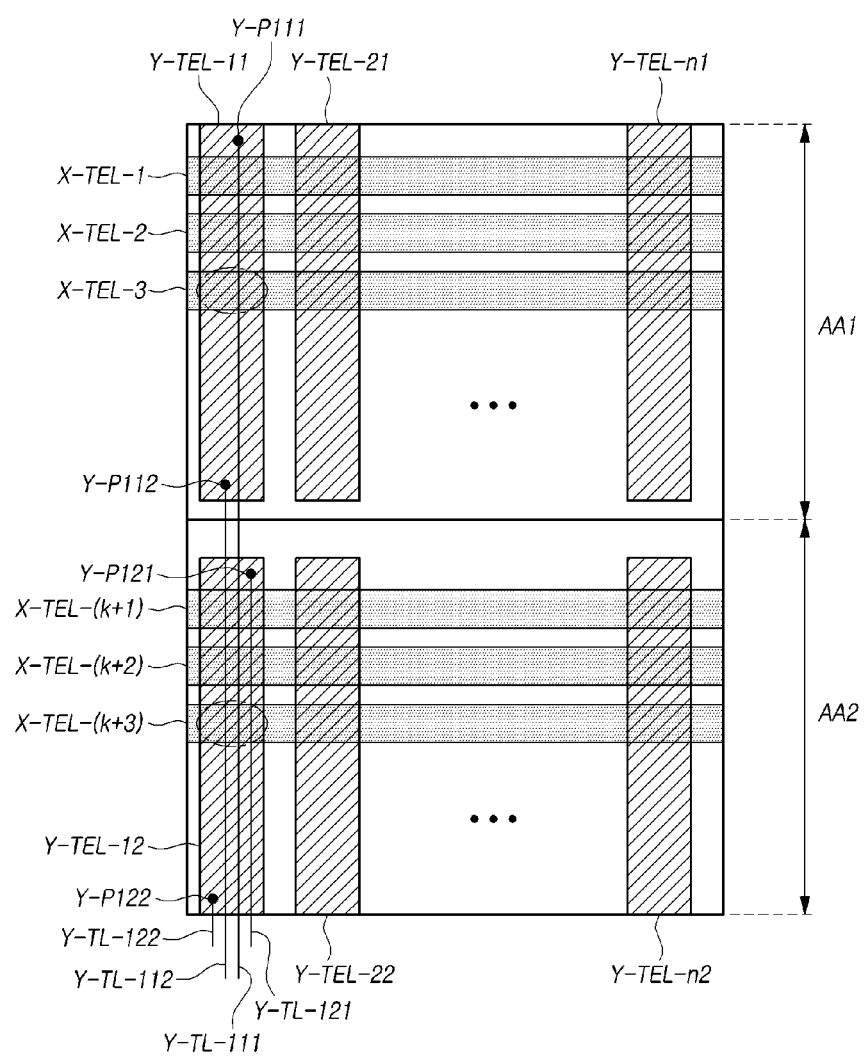
FIG. 14 is a diagram schematically illustrating another example of a structure of a touch electrode line and a touch routing line disposed in a display panel according to embodiments of the present disclosure.

FIG. 14 is a diagram schematically illustrating another example of a structure of the touch electrode line TEL and the touch routing line TL disposed in the display panel DISP according to embodiments of the present disclosure.

Referring to FIG. 14, the active area AA of the display panel DSIP can comprise a first active area AA1 and a second active area AA2. FIG. 14 exemplarily illustrates a case that the first active area AA1 is an upper area and the second active area AA2 is a lower area, the first active area AA1 and the second active area AA2 can be separated as a left (or right) area and a right (or left) area.

Furthermore, the first active area AA1 and the second active area AA2 can be separated areas on a flat display panel DISP, or can be separated areas on a basis of a folded portion when the display panel DISP is a foldable type.

The plurality of X-touch electrode lines X-TEL and the plurality of Y-touch electrode lines Y-TEL can be disposed on the first active area AA1 and the second active area AA2. The Y-touch electrode line Y-TEL disposed on the first active area AA1 and the Y-touch electrode line Y-TEL disposed on the second active area AA2 can be separated each other.

For example, a first Y-touch electrode line Y-TEL-1 can comprise a first group Y-TEL-11 disposed on the first active area AA1 and a second group Y-TEL-12 disposed on the second active area AA2.

The first group Y-TEL-11 can comprise two or more Y-touch electrodes Y-TE electrically connected to each other. The first group Y-TEL-11 can be electrically connected to the plurality of Y-touch routing lines Y-TL, and can be electrically connected to a first line Y-TL-111 and a second line Y-TL-112.

For example, the first group Y-TEL-11 can be electrically connected to the first line Y-TL-111 on a first point Y-P111 located on an upper side of the first active area AA1. Furthermore, the first group Y-TEL-11 can be electrically connected to the second line Y-TL-112 on a second point Y-P112 located on a lower side of the first active area AA1.

The second group Y-TEL-12 can comprise two or more Y-touch electrodes Y-TE electrically connected to each other. The second group Y-TEL-12 can be electrically connected to the plurality of Y-touch routing lines Y-TL, and can be electrically connected to a first line Y-TL-121 and a second line Y-TL-122.

For example, the second group Y-TEL-12 can be electrically connected to the first line Y-TL-121 on a first point Y-P121 located on an upper side of the second active area AA2, and can be electrically connected to the second line Y-TL-122 on a second point Y-P122 located on a lower side of the second active area AA2.

A distance between points where the first group Y-TEL-11 is connected to lines Y-TL-111, Y-TL-112 can be smaller than a distance between both ends of the first group Y-TEL-11. Furthermore, a distance between points where the second group Y-TEL-12 is connected to lines Y-TL-121, Y-TL-122 can be smaller than a distance between both ends of the second group Y-TEL-12.

And the distance between points where the first group Y-TEL-11 is connected to the lines Y-TL-111, Y-TL-112 can be same as or different from the distance between points where the second group Y-TEL-12 is connected to the lines Y-TL-121, Y-TL-122.

As the Y-touch electrode line Y-TEL is separated as a plurality of groups and the plurality of Y-touch routing lines Y-TL is electrically connected to each of the plurality of groups, an increase of a load depending on a position of the touch electrode line TEL can be prevented, a difference of the load can be reduced, and the performance of the touch sensing can be improved.

Furthermore, as at least a portion of the touch routing line TL is disposed on the active area AA, an increase of an area required for an arrangement of the touch routing line TL can be prevented while improving the performance of the touch sensing.

The touch routing line TL disposed on the active area AA can be disposed on an area surrounded by the touch electrode line TEL electrically connected to the touch routing line TL. Alternatively, the touch routing line TL disposed on the active area AA can be disposed on an area surrounded by the touch electrode line TEL which is insulated from the touch routing line TL and is supplied a same signal as a signal supplied to the touch electrode line TEL electrically connected to the touch routing line TL.

Figure 15A:
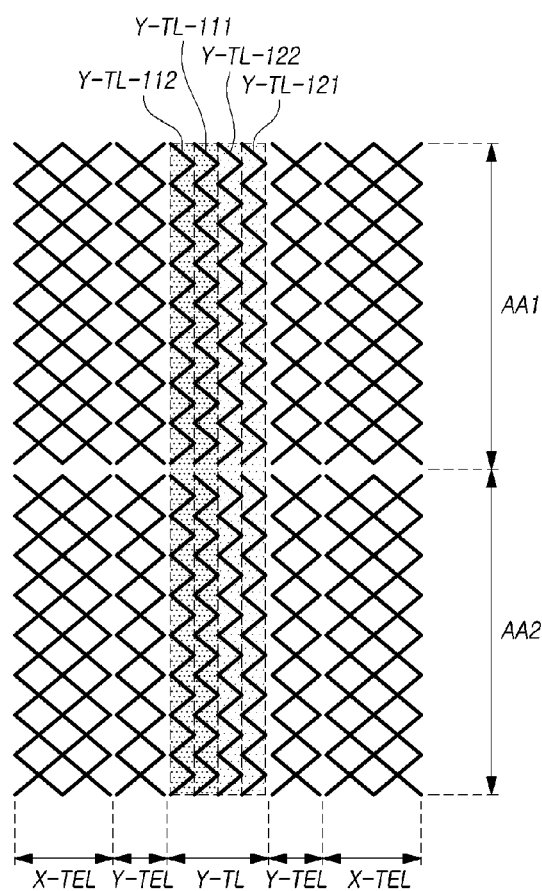
FIGS. 15A to 15C are diagrams illustrating examples of a specific structure of the touch electrode line and the touch routing line disposed in the display panel shown in FIG. 14 according to embodiments of the present disclosure.
Figure 15B:
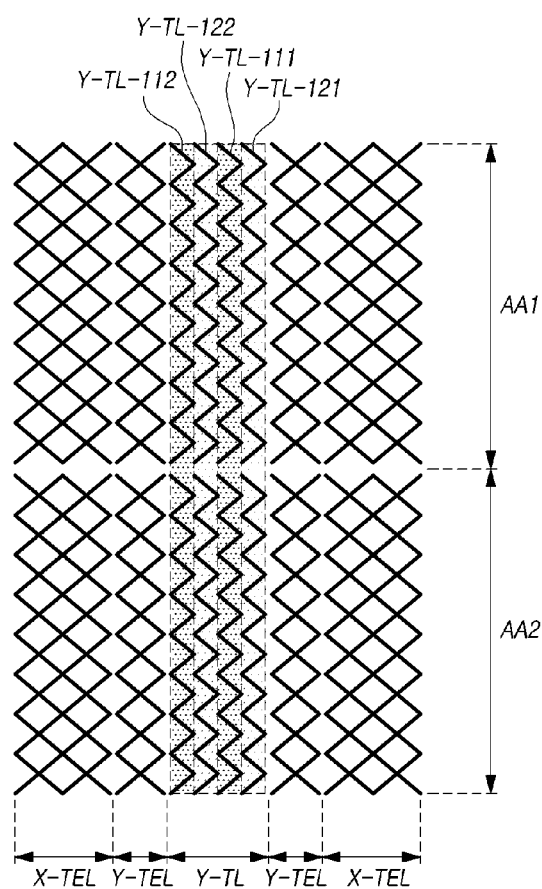
Figure 15C:
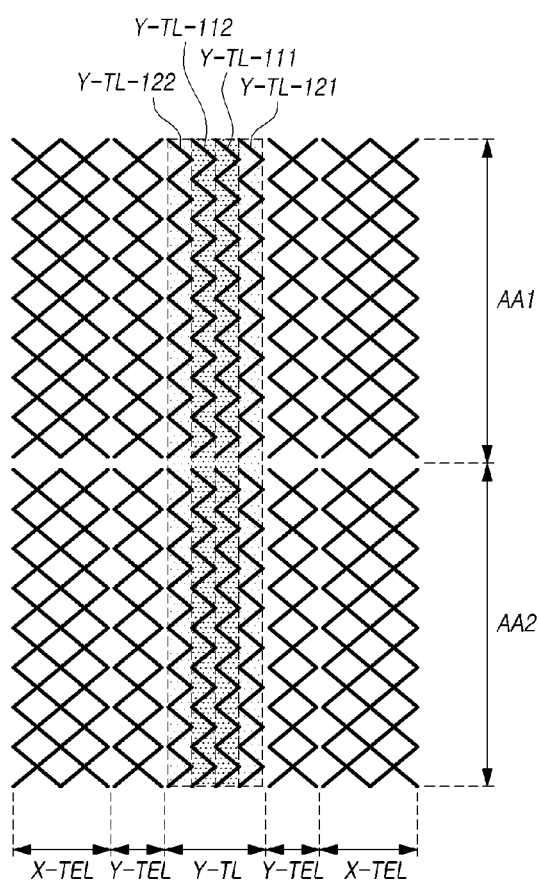

FIGS. 15A to 15C are diagrams illustrating examples of a specific structure of the touch electrode line TEL and the touch routing line TL disposed in the display panel DISP shown in FIG. 14 according to one embodiment.

Referring to FIGS. 15A to 15C, they illustrate examples of an enlarged structure of a portion indicated by a circle in the first active area AA1 and a portion indicated by a circle in the second active area AA2 of FIG. 14.

The first Y-touch routing line Y-TL-1 can comprise the first line Y-TL-111 and the second line Y-TL-112 which are electrically connected to the first group Y-TEL-11 of the first Y-touch electrode line Y-TEL-1. Furthermore, the first Y-touch routing line Y-TL-1 can comprise the first line Y-TL-121 and the second line Y-TL-122 which are electrically connected to the second group Y-TEL-12 of the first Y-touch electrode line Y-TEL-1.

The first line Y-TL-111 and the second line Y-TL-112 for the first group Y-TEL-11 and the first line Y-TL-121 and the second line Y-TL-122 for the second group Y-TEL-12 can be disposed on the first active area AA1 and the second active area AA2 entirely.

That is, each of lines included in the Y-touch routing line Y-TL can be disposed across the first active area AA1 and the second active area AA2 and can be made as a different line according to a point connected to the Y-touch electrode line Y-TEL.

Each of lines electrically connected to the Y-touch electrode line Y-TEL can be disposed on an area surrounded by the Y-touch electrode line Y-TEL.

The lines Y-TL-111, Y-TL-112 for the first group Y-TEL-11 can be disposed on an area surrounded by the first group Y-TEL-11 and an area surrounded by the second group Y-TEL-12. Furthermore, the lines Y-TL-121, Y-TL-122 for the second group Y-TEL-12 can be also disposed on the area surrounded by the first group Y-TEL-11 and the area surrounded by the second group Y-TEL-12.

Thus, as the Y-touch routing line Y-TL disposed on the first active area AA1 and the second active area AA2 is located to be apart from the X-touch electrode line X-TEL, the Y-touch routing line Y-TL can be implemented on the active area AA while preventing a noise by the X-touch electrode line.

Each of lines included in the Y-touch routing line Y-TL can be disposed adjacent to lines connected to a same group.

Such as an example illustrated in FIG. 15A, the first line Y-TL-111 and the second line Y-TL-112 for the first group Y-TEL-11 are disposed adjacently, the first line Y-TL-121 and the second line Y-TL-122 for the second group Y-TEL-12 can be disposed adjacently.

Alternatively, such as an example illustrated in FIG. 15B, the lines Y-TL-111, Y-TL-112 for the first group Y-TEL-11 and the lines Y-TL-121, Y-TL-122 for the second group Y-TEL-12 can be disposed alternatively.

Alternatively, such as an example illustrated in FIG. 15C, the lines Y-TL-111, Y-TL-112 for the first group Y-TEL-11 can be disposed on a central region, and the lines Y-TL-121, Y-TL-122 for the second group Y-TEL-12 can be disposed on both sides of an area where the lines Y-TL-111, Y-TL-112 for the first group Y-TEL-11 are disposed.

Furthermore, FIGS. 15A to 15C illustrate a case that the Y-touch routing line Y-TL is a line shape corresponding to an outer line of the touch electrode line TEL, but as described above, the Y-touch routing line Y-TL can be a shape comprising a same pattern as a pattern included in the touch electrode line TEL.

Furthermore, in some cases, the first Y-touch routing line Y-TL-1 electrically connected to the second group Y-TEL-12 may not be extended to an area where the first group Y-TEL-11 is disposed.

That is, the lines Y-TL-121, Y-TL-122 electrically connected to the second group Y-TEL-12 can be located outside of an outer line of the first group Y-TEL-11.

In this case, in an area where the first group Y-TEL-11 is disposed, a remaining area of the first Y-touch routing line Y-TL-1 can be used for the touch routing line TL for the first group Y-TEL-11, or can be used for the touch electrode TE.

Figure 16A:
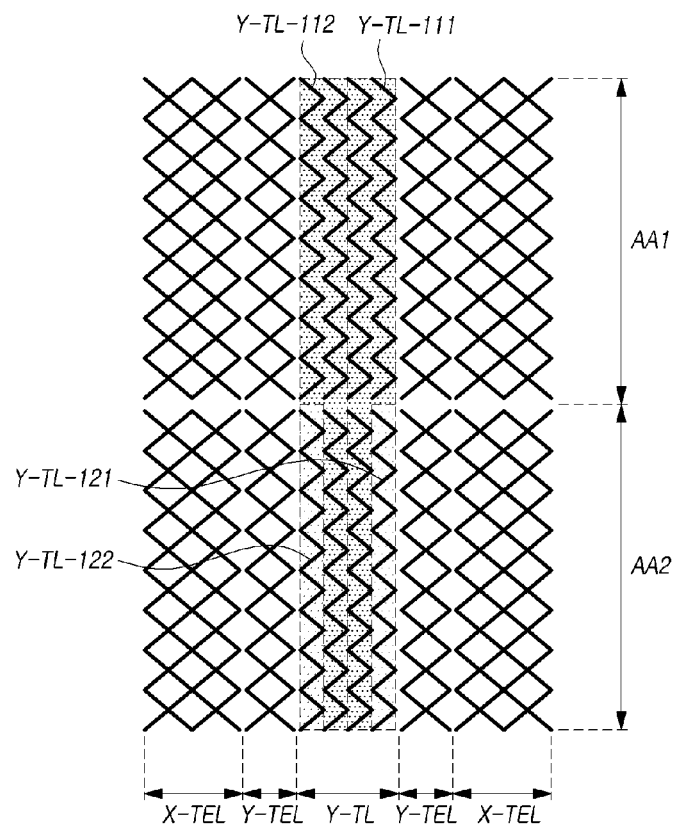
FIGS. 16A and 16B are diagrams illustrating other examples of a specific structure of the touch electrode line and the touch routing line disposed in the display panel shown in FIG. 14 according to embodiments of the present disclosure.
Figure 16B:
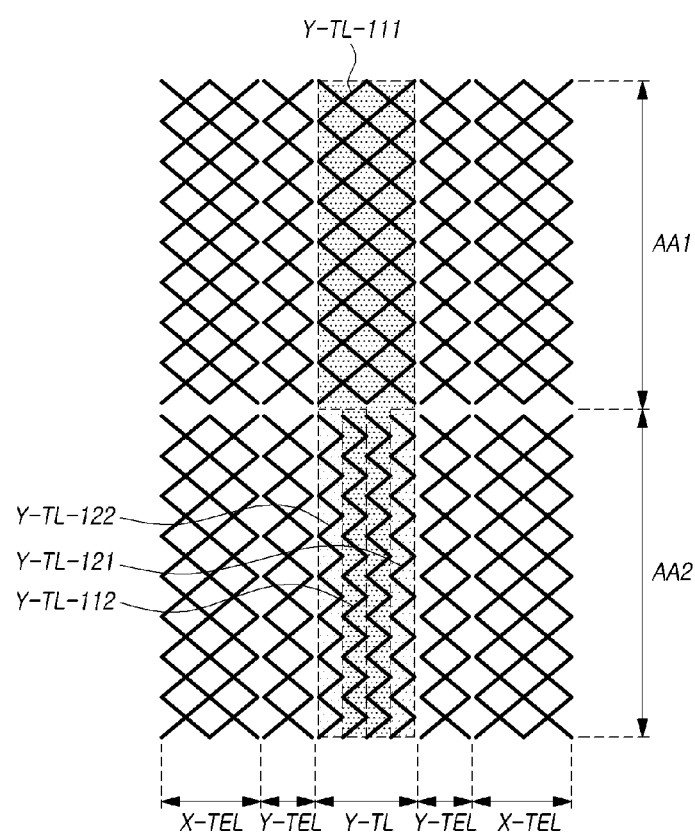

FIGS. 16A and 16B are diagrams illustrating other examples of a specific structure of the touch electrode line TEL and the touch routing line TL disposed in the display panel DISP shown in FIG. 14.

Referring to FIGS. 16A and 16B, they illustrate examples of an enlarged structure of a portion indicated by a circle in the first active area AA1 and a portion indicated by a circle in the second active area AA2 of FIG. 14.

The first Y-touch routing line Y-TL-1 can comprise the first line Y-TL-111 and the second line Y-TL-112 which are electrically connected to the first group Y-TEL-11, and can comprise the first line Y-TL-121 and the second line Y-TL-122 which are electrically connected to the second group Y-TEL-12.

The first line Y-TL-111 and the second line Y-TL-112 for the first group Y-TEL-11 can be disposed from the second active area AA2 to the first active area AA1 to be electrically connected to the first group Y-TEL-11 on the first active area AA1.

The first line Y-TL-121 and the second line Y-TL-122 for the second group Y-TEL-12 can be disposed on the second active area AA2, and may not be extended to the first active area AA1. And the first line Y-TL-121 and the second line Y-TL-122 for the second group Y-TEL-12 can be electrically connected to the second group Y-TEL-12 on the second active area AA2.

Since the lines Y-TL-121, Y-TL-122 for the second group Y-TEL-12 isn't extended to the first active area AA1, the touch sensor metal TSM located on an extension line of the lines Y-TL-121, Y-TL-122 for the second group Y-TEL-12 on the first active area AA1 can constitute the lines Y-TL-111, Y-TL-112 for the first group Y-TEL-11.

Thus, a resistance of a line for the first group Y-TEL-11 whose length is long can be reduced.

Alternatively, in some cases, the touch sensor metal TSM disposed on an area of the first Y-touch routing line Y-TL-1 of the first active area AA1 can constitute the first line Y-TL-111 for the first group Y-TEL-11.

Referring to FIG. 16B, the first line Y-TL-121 and the second line Y-TL-122 for the second group Y-TEL-12 can be disposed on the second active area AA2 to be electrically connected to the second group Y-TEL-12.

The second line Y-TL-112 of lines for the first group Y-TEL-11 can be disposed on the second active area AA2, and can be electrically connected to the first group Y-TEL-11 on a boundary of the first active area AA1.

As the second line Y-TL-112 for the first group Y-TEL-11 is electrically connected to the first group Y-TEL-11 on the boundary of the first active area AA1, an area of the first Y-touch routing line Y-TL-1 on the first active area AA1 can be used as an area where the first line Y-TL-111 for the first group Y-TEL-11 is disposed.

Thus, a resistance of the first line Y-TL-1 for the first group Y-TEL-11 whose length is long can be reduced.

Furthermore, as described above, the touch routing line TL disposed on an area surrounded by the touch electrode line TEL can be a line shape, or such as an example illustrated in FIG. 16B, can comprise a same pattern as a pattern included in the touch electrode TE.

Furthermore, in some cases, in a case that some of the first Y-touch routing line Y-TL-1 isn't disposed to the first active area AA1, some of an area of the first Y-touch routing line Y-TL-1 on the first active area AA1 can constitute a portion of the Y-touch electrode Y-TE included in the first group Y-TEL-11.

As described above, as the plurality of touch routing line TL disposed on the active area AA can be connected to the touch electrode line TEL in a structure that the touch electrode line TEL disposed on the active area AA is separated, the load by the touch routing line TL can be reduced without an increase of an area for an arrangement of the touch routing line TL, and the performance of the touch sensing can be improved.

Furthermore, as the touch routing line TL is disposed on an area surrounded by the touch electrode line TEL electrically connected to the touch routing line TL, a noise by the touch electrode line TEL being supplied a different signal can be prevented.

Furthermore, according to embodiments of the present disclosure, it can be provided a structure that a pattern being capable of preventing a noise is disposed between the touch routing line TL and the touch electrode line TEL for preventing an influence by another touch electrode line TEL being supplied a same signal.

Figure 17:
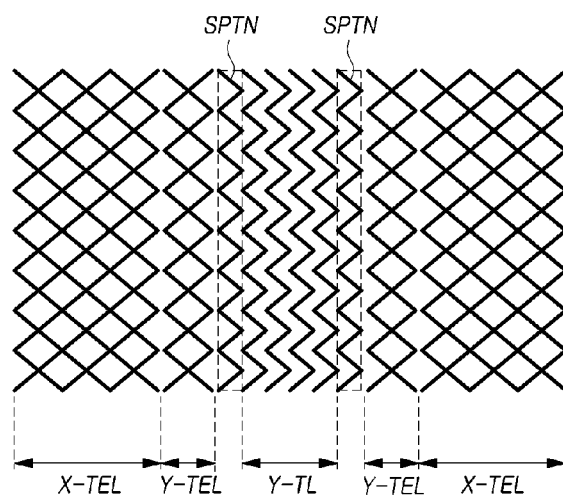
FIG. 17 is a diagram illustrating another example of a specific structure of the touch electrode line and the touch routing line disposed in the display panel shown in FIG. 14 according to embodiments of the present disclosure.

FIG. 17 is a diagram illustrating other examples of a specific structure of the touch electrode line TEL and the touch routing line TL disposed in the display panel DISP shown in FIG. 14 according to one embodiment.

Referring to FIG. 17, it illustrates an example of an enlarged structure of a portion indicated by a circle in the first active area AA1 and a portion indicated by a circle in the second active area AA2 of FIG. 14.

Some of lines disposed on an area of the Y-touch routing line Y-TL can be lines electrically connected to the Y-touch electrode line Y-TEL disposed on the first active area AA1, and some others can be lines electrically connected to the Y-touch electrode line Y-TEL disposed on the second active area AA2.

Thus, some of the plurality of Y-touch routing lines Y-TL disposed on an area surrounded by the Y-touch electrode line Y-TEL can be lines insulated from the Y-touch electrode line Y-TEL surrounding the Y-touch routing line Y-TL.

At least one shieling pattern SPTN can be disposed between an area of the Y-touch routing line Y-TL and the Y-touch electrode line Y-TEL surrounding the Y-touch routing line Y-TL.

The shielding pattern SPTN can be disposed to be separated from the Y-touch electrode line Y-TEL and the Y-touch routing line Y-TL.

The shielding pattern SPTN can be floating state which an electrical signal is not supplied, or can be a state that a constant voltage (e.g., GND) of a certain level is supplied.

Alternatively, the shielding pattern SPTN can be a state that a signal corresponding to a signal supplied to the X-touch electrode line X-TEL or the Y-touch electrode line Y-TEL is supplied. Here, the signal corresponding to the signal supplied to the touch electrode line TEL can mean a signal that at least one of a frequency, an amplitude and a phase of the signal is same as the signal supplied to the touch electrode line TEL.

As the shielding pattern SPTN is disposed between the Y-touch routing line Y-TL and the Y-touch electrode line Y-TEL, it can be prevented that a voltage level of the Y-touch electrode line Y-TEL or a signal supplied to the Y-touch electrode line Y-TEL affect the Y-touch routing line Y-TL which is not connected to the Y-touch electrode line Y-TEL.

That is, in the example described by FIG. 14, even if the first line Y-TL-111 and the second line Y-TL-112 which are electrically connected to the first group Y-TEL-11 of the first Y-touch electrode line Y-TEL-1 disposed on the first active area AA1 are disposed on an area surrounded by the second group Y-TEL-12, it can be prevented that the second group Y-TEL-12 affect to the first line Y-TL-111 and the second line Y-TL-112 for the first group Y-TEL-11 by the shielding pattern SPTN.

Above shielding pattern SPTN, as well as a structure illustrated in FIG. 14, can be applied to whole structures that the touch routing line TL is disposed to be surrounded by the touch electrode line TEL which is supplied a same signal but isn't electrically connected to the touch routing line TL.

That is, in a case that a portion of the X-touch routing line X-TL electrically connected to X-touch electrode line X-TEL is located on an area surrounded by other X-touch electrode line X-TEL which is not electrically connected to the X-touch routing line X-TL, by disposing the shielding pattern SPTN between the X-touch routing line X-TL and the other X-touch electrode line X-TEL, it can be prevented that a same kinds of touch electrode line TEL affects to the touch routing line TL disposed on the active area AA.

Figure 18A:
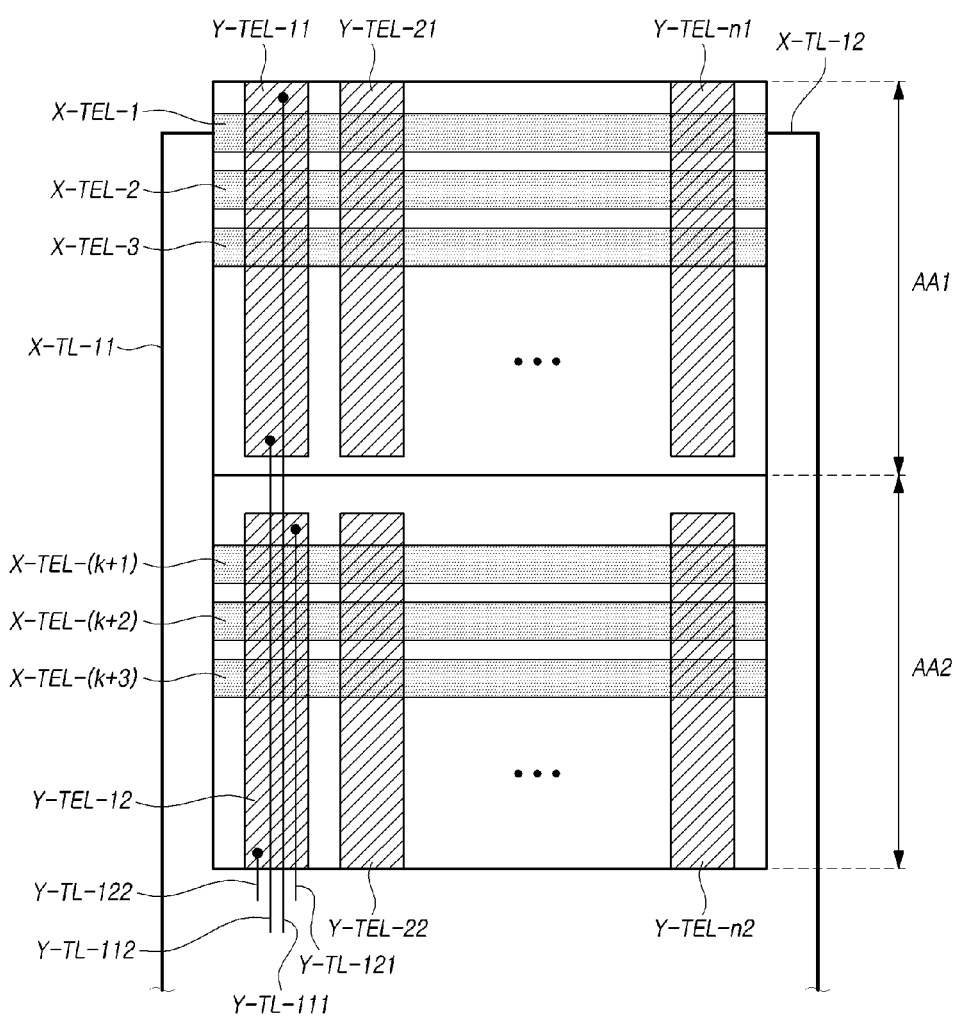
FIGS. 18A to 18C are diagrams schematically illustrating other examples of a structure of the touch electrode line and the touch routing line disposed in the display panel shown in FIG. 14 according to embodiments of the present disclosure.
Figure 18B:
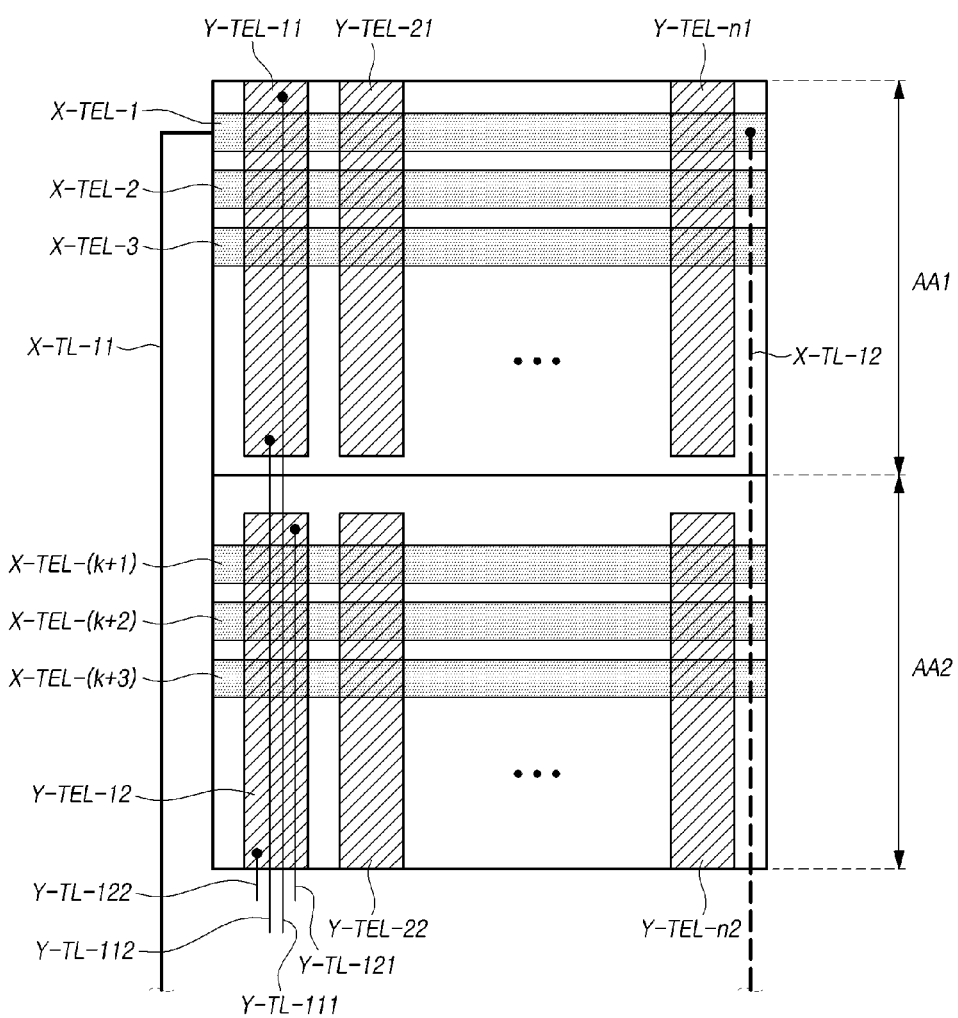
Figure 18C:
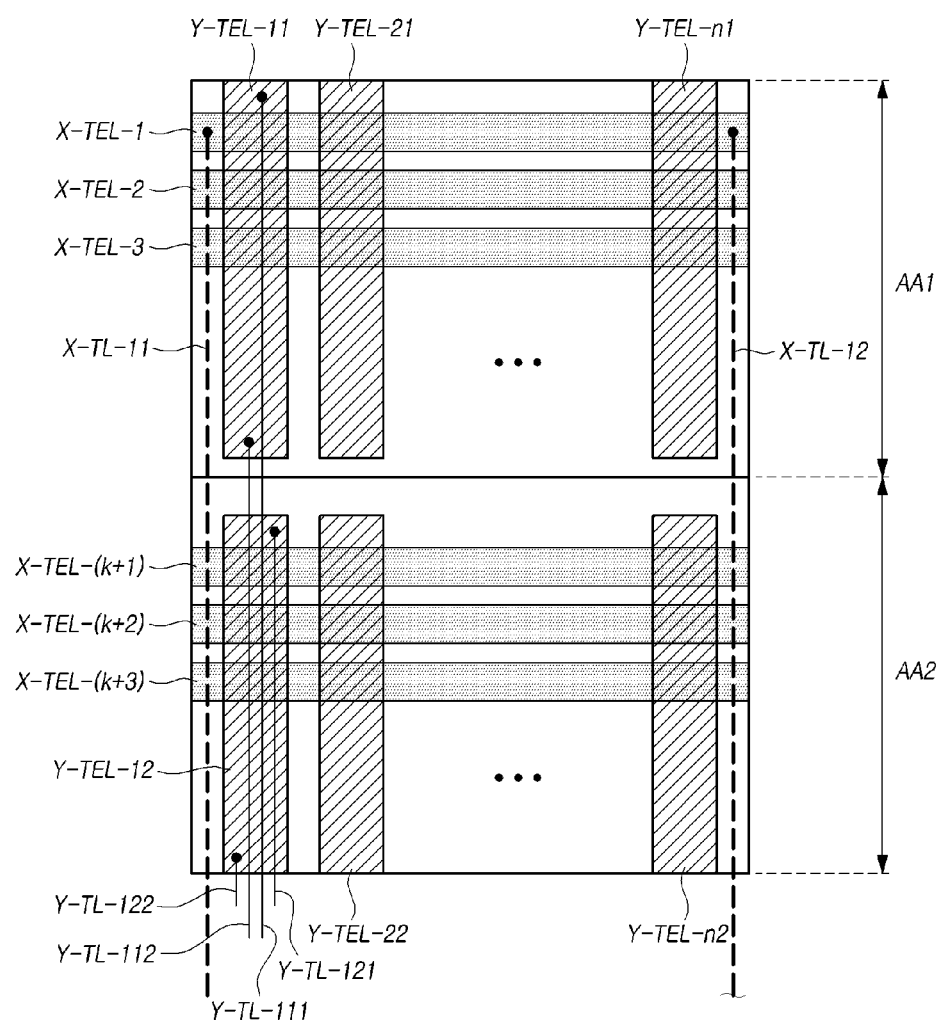

FIGS. 18A to 18C are diagrams schematically illustrating other examples of a structure of the touch electrode line TEL and the touch routing line TL disposed in the display panel DISP shown in FIG. 14 according to one embodiment.

Referring to FIG. 18A, in a case that the Y-touch electrode line Y-TEL is disposed as a separated structure on the first active area AA1 and the second active area AA2 and is electrically connected to the Y-touch routing line Y-TL disposed on the active area AA, the X-touch electrode line X-TEL can be electrically connected to the plurality of X-touch routing lines X-TL disposed on the non-active area NA.

For example, the first X-touch electrode line X-TEL-1 disposed on the first active area AA1 can be electrically connected to the first line X-TL-11 and the second line X-TL-12 of the first X-touch routing line X-TL-1 disposed on the non-active area NA.

As the Y-touch routing line Y-TL is disposed on the active area AA, the X-touch routing line X-TL can be disposed on the non-active area NA which secures a spare space.

Alternatively, at least some of the plurality of X-touch routing lines X-TL electrically connected to the X-touch electrode line X-TEL can be disposed on the active area AA.

Referring to FIG. 18B, the first line X-TL-11 of the first X-touch routing line X-TL-1 electrically connected to the first X-touch electrode line X-TEL-1 can be disposed on the non-active area NA, and the second line X-TL-12 of the first X-touch routing line X-TL-1 can be disposed on the active area AA.

Alternatively, such as an example illustrated in FIG. 18C, all of the first line X-TL-11 and the second line X-TL-12 of the first X-touch routing line X-TL-1 can be disposed on the active area AA and the first line X-TL-11 and the second line X-TL-12 can be electrically connected to the first X-touch electrode line X-TEL-1 on different points.

As described above, according to embodiments of the present disclosure, as the touch electrode line TEL is connected to the plurality of touch routing lines TL and the plurality of touch routing lines TL is disposed on the active area AA and the non-active area NA as various structures, the load by the touch routing line TL can be reduced while minimizing an increase of an area due to an arrangement of the touch routing line TL, and the performance of the touch sensing can be improved.

FIGS. 19A to 19D are diagrams schematically illustrating other examples of a structure of the touch electrode line TEL and the touch routing line TL disposed in the display panel DISP according to embodiments of the present disclosure.

Figure 19A:
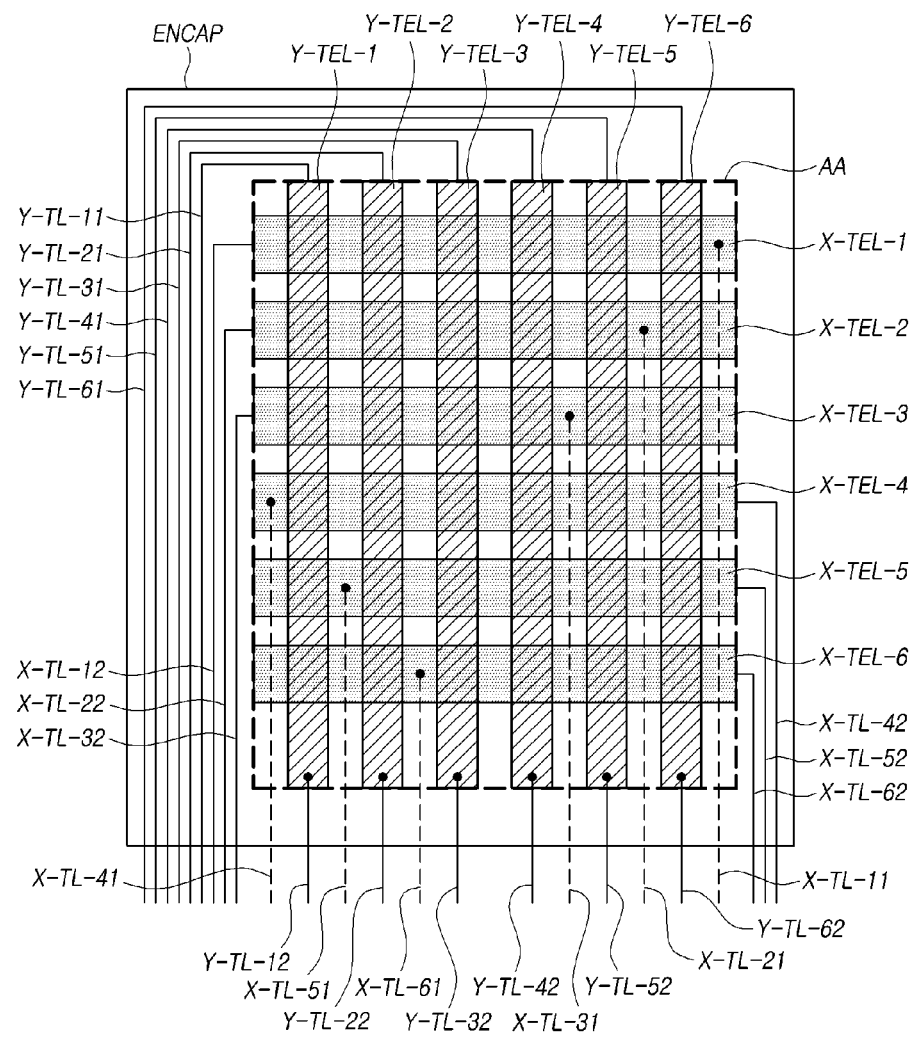
FIGS. 19A to 19D are diagrams schematically illustrating other examples of a structure of a touch electrode line and a touch routing line disposed in a display panel according to embodiments of the present disclosure.

Referring to FIG. 19A, each of the plurality of X-touch electrode lines X-TEL can be electrically connected to the plurality of X-touch routing lines X-TL. And also, each of the plurality of Y-touch electrode lines Y-TEL can be electrically connected to the plurality of Y-touch routing lines Y-TL.

One X-touch routing line X-TL-11, X-TL-21, X-TL-31, X-TL-41, X-TL-51, X-TL-61 of the X-touch routing line X-TL electrically connected to each X-touch electrode line X-TEL can be disposed at least a partially on the active area AA to be electrically connected to the X-touch electrode line X-TEL. And another X-touch routing line X-TL-12, X-TL-22, X-TL-32, X-TL-42, X-TL-52, X-TL-62 can be disposed on the non-active area NA to be electrically connected to the X-touch electrode line X-TEL.

Furthermore, the Y-touch routing line Y-TL-11, Y-TL-12, Y-TL-21, Y-TL-22, Y-TL-31, Y-TL-32, Y-TL-41, Y-TL-42, Y-TL-51, Y-TL-52, Y-TL-61, Y-TL-62 electrically connected to the Y-touch electrode line Y-TEL can be disposed on the non-active area NA to be electrically connected to the Y-touch electrode line Y-TEL.

Thus, in a structure that the plurality of touch routing line TL is connected to each touch electrode line TEL, as some of the touch routing lines TL is disposed on the active area AA and rest of the touch routing lines TL is disposed on the non-active area NA to be dispersed, a structure that the plurality of touch routing lines TL is connected to the touch electrode line TEL while reducing the non-active area NA can be implemented.

And the touch routing line TL disposed on the active area AA can be disposed on an area surrounded by the touch electrode line TEL electrically connected to the touch routing line TL or the touch electrode line TEL being supplied a same signal. Thus, it can be prevented that a noise by the touch electrode line TEL being supplied a different signal is generated to the touch routing line TL.

Figure 19B:
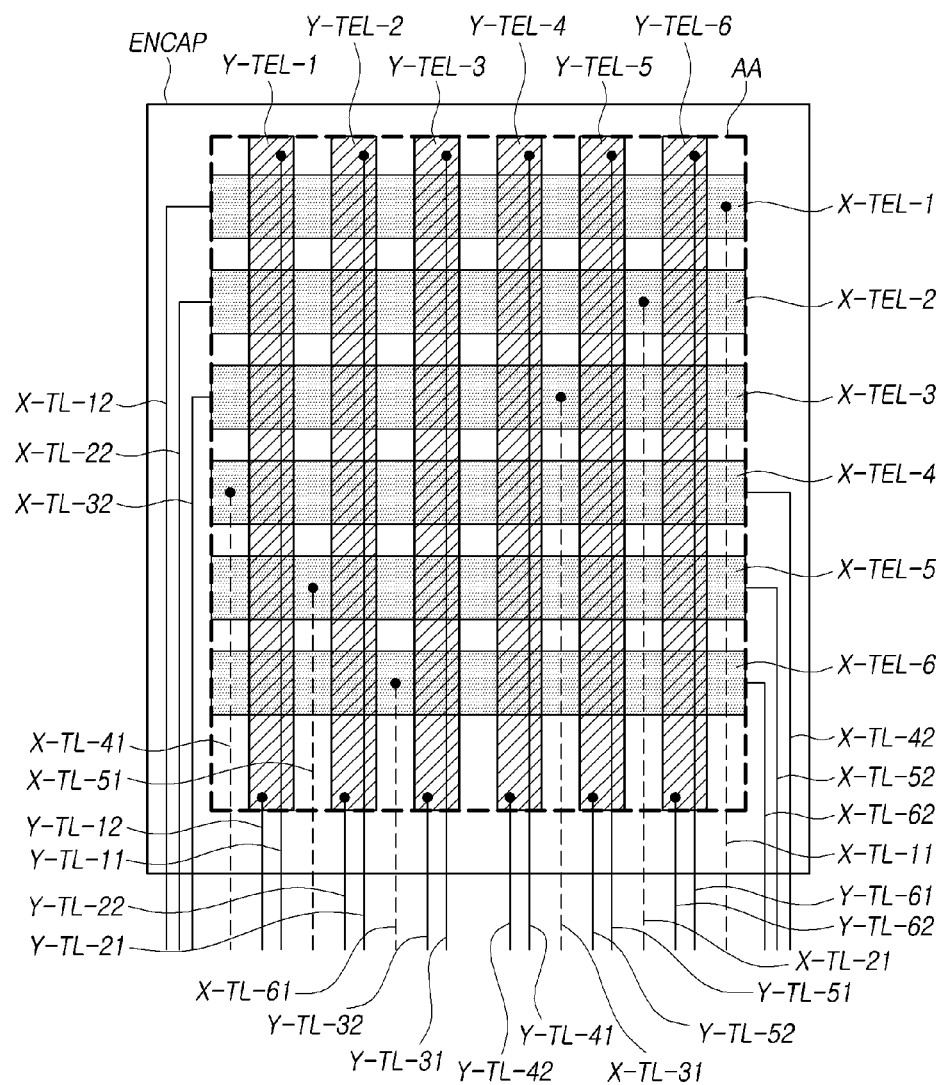

Alternatively, such as an example illustrated in FIG. 19B, one Y-touch routing line Y-TL-11, Y-TL-21, Y-TL-31, Y-TL-41, Y-TL-51, Y-TL-61 of the Y-touch routing line Y-TL electrically connected to each Y-touch electrode line Y-TEL can be disposed at least a partially on the active area AA to be electrically connected to the Y-touch electrode line Y-TEL. And another Y-touch routing line Y-TL-12, Y-TL-22, Y-TL-32, Y-TL-42, Y-TL-52, Y-TL-62 can be disposed on the non-active area NA to be electrically connected to the Y-touch electrode line Y-TEL.

Alternatively, at least a portion of all X-touch routing lines X-TL and at least a portion of all Y-touch routing lines Y-TL can be disposed on the active area AA, and the touch routing line TL and the touch electrode line TEL can be electrically connected to each other.

Thus, by disposing a portion of the X-touch routing line X-TL and a portion of the Y-touch routing line Y-TL on the active area AA, an arrangement structure of the touch routing line TL that the load is reduced can be implemented while reducing the non-active area NA further.

Furthermore, since the touch routing line TL electrically connected to the touch electrode line TEL can be disposed on the active area AA and the non-active area NA, an arrangement of additional touch routing line TL can be easy. Thus, the touch electrode line TEL is disposed as a separated structure on the active area AA, and a structure that the plurality of touch routing lines TL is connected to each of separated portions can be implemented.

Figure 19C:
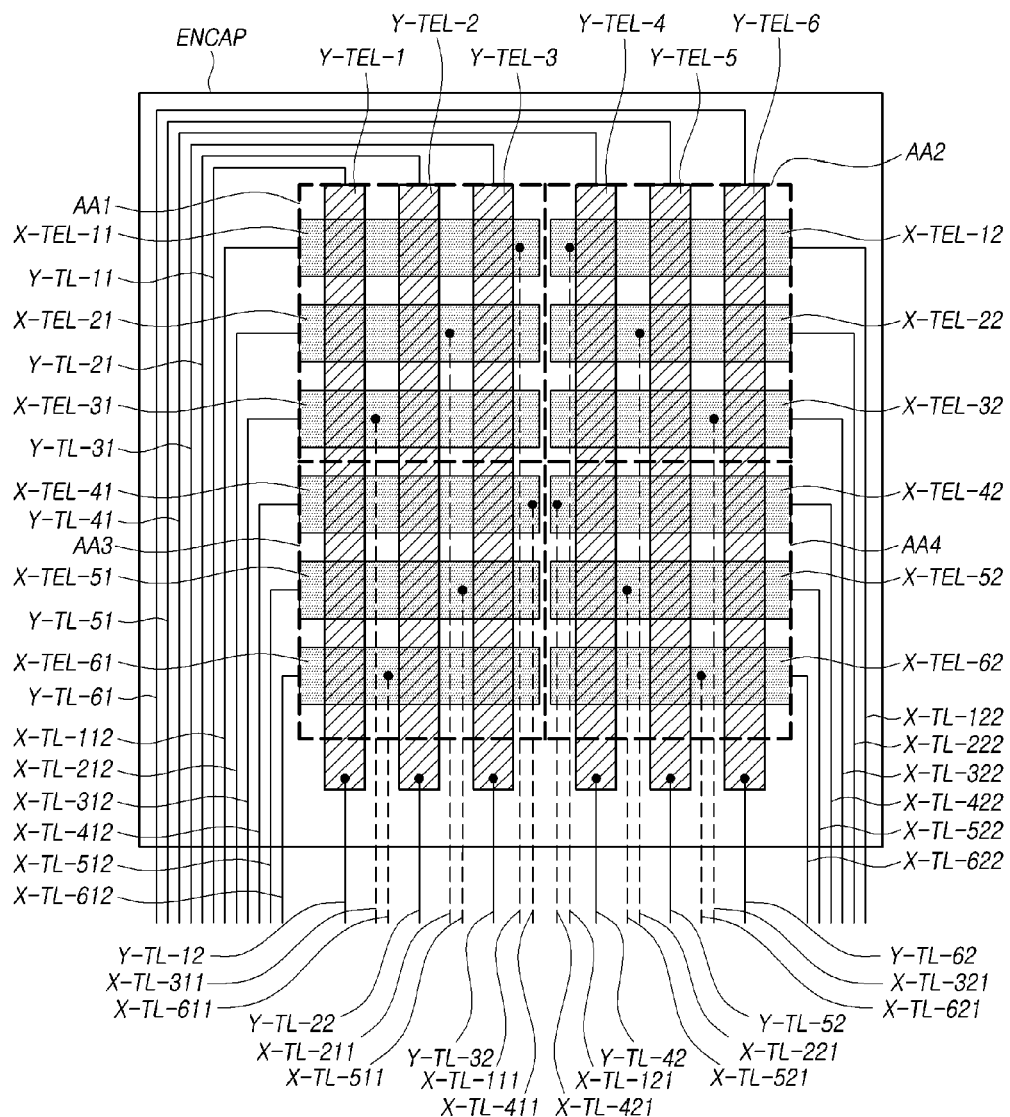
Figure 19D:
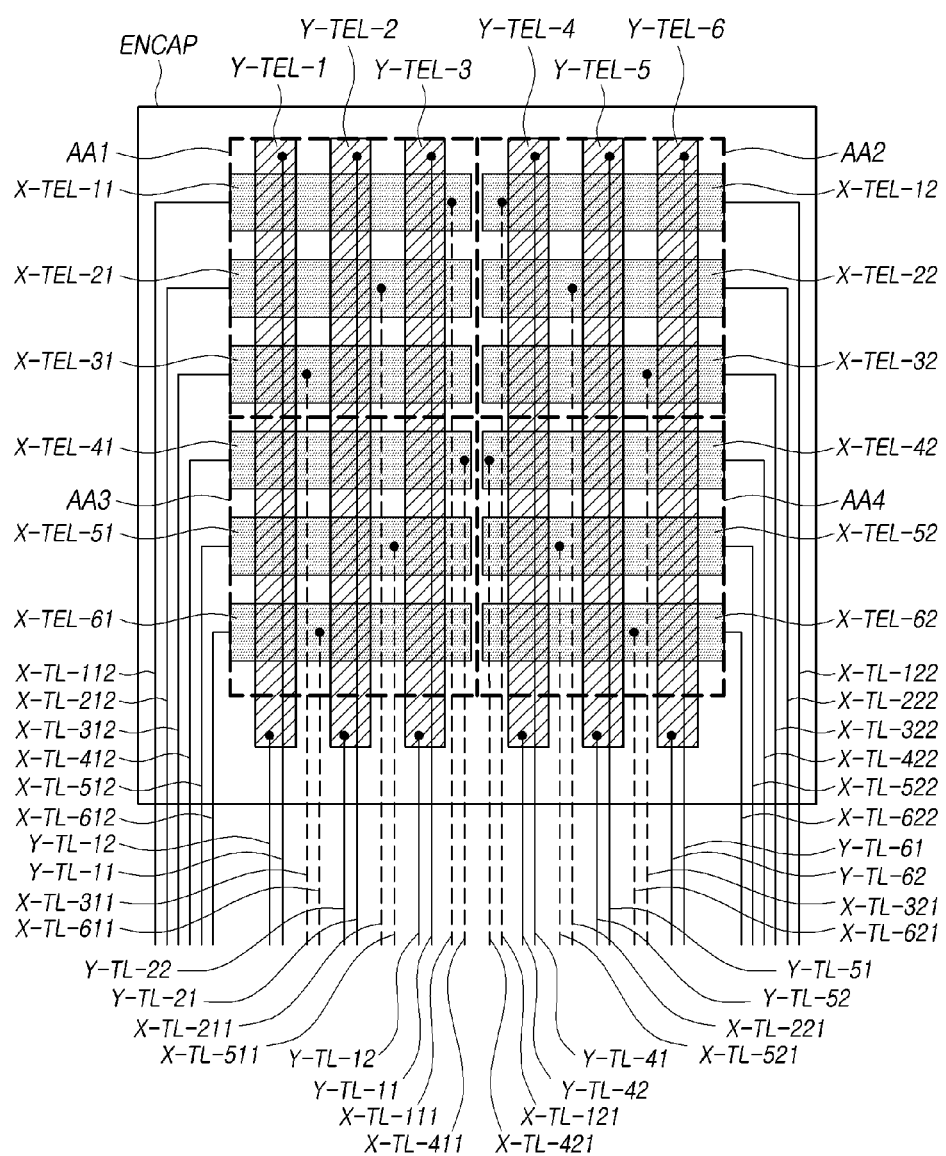

Referring to FIGS. 19C and 19D, for example, they illustrate examples of a structure that X-touch electrode line X-TEL is separated as the first group X-TEL-11, X-TEL-21, X-TEL-31, X-TEL-41, X-TEL-51, X-TEL-61 and the second group X-TEL-12, X-TEL-22, X-TEL-32, X-TEL-42, X-TEL-52, X-TEL-62. Furthermore, as described above, the Y-touch electrode line Y-TEL can be a separated structure also, in this case, the active area AA can be separated as four active area AA1, AA2, AA3, AA4.

The plurality of Y-touch routing lines Y-TL can be connected to one Y-touch electrode line Y-TEL. and the plurality of X-touch routing lines X-TL can be connected to each of portions that one X-touch electrode line X-TEL is separated Among the X-touch routing line X-TL and the Y-touch routing line Y-TL, such as an example illustrated in FIG. 19C, only some of the X-touch routing line X-TL can be disposed on the active area AA. Alternatively, such as an example illustrated in FIG. 19D, some of the X-touch routing line X-TL and some of the Y-touch routing line Y-TL can be disposed on the active area AA. Alternatively, in some cases, all of the X-touch routing line X-TL and all of the Y-touch routing line Y-TL can be disposed on the active area AA to be electrically connected to the touch electrode line TEL.

According to embodiments of the present disclosure, as at least some of the touch routing line TL disposed on a same layer as the touch electrode line TEL is disposed on the active area AA, an additional arrangement of the touch routing line TL can be possible.

Thus, by increasing a number of the touch routing line TL connected to the touch electrode line TEL, the load of the touch routing line TL can be reduced, and the performance of the touch sensing can be improved.

Furthermore, as the touch routing line TL is connected to the touch electrode line TEL on the active area AA, by adjusting a position of a point that the touch electrode line TEL is connected to the plurality of touch routing lines TL, a degree that the sensitivity of the touch sensing is dropped depending on positions can be reduced, or a difference of the touch sensing depending on positions can be reduced.

Furthermore, the touch routing line TL disposed on the active area AA can be disposed on an area surrounded by the touch electrode line TEL electrically connected to the touch routing line TL, or can be disposed on an area surrounded by the touch electrode line TEL being supplied a same signal as the touch electrode line TEL connected to the touch routing line TL.

Therefore, it can be prevented or reduced that the touch routing line TL disposed on the active area AA receives a noise influence by different kinds of the touch electrode line TEL disposed on the active area AA, and various arrangement structure of the touch routing line TL that is capable of improving the performance of the touch sensing can be implemented.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A touch display device comprising:
    a X-touch electrode line comprising a plurality of X-touch electrodes disposed on an active area on an encapsulation layer, at least some of the plurality of X-touch electrodes electrically connected to each other along a first direction;
    a Y-touch electrode line comprising a plurality of Y-touch electrodes disposed on the active area on the encapsulation layer, at least some of the plurality of Y-touch electrodes are electrically connected to each other along a second direction that crosses the first direction;
    a plurality of touch routing lines, a portion of a touch routing line from the plurality of touch routing lines on the encapsulation layer, and each of the plurality of touch routing lines is electrically connected to one of the X-touch electrode line and the Y-touch electrode line;
    a plurality of touch pads connected to the plurality of touch routing lines;
    an insulating layer on the X-touch electrode line and the Y-touch electrode line; and
    a color filter on the insulating layer,
    wherein each of at least one of the plurality of touch routing lines comprises a first part on a non-active area located outside the active area and a second part connected to the first part, at least a portion of the second part is on the active area, and the second part is electrically connected to one of the X-touch electrode line and the Y-touch electrode line,
    wherein the plurality of touch routing lines includes a first touch routing line and a second routing line, and the plurality of touch pads includes a first touch pad and a second touch pad, and
    wherein the first touch routing line is connected to the X-touch electrode line and the first touch pad, and the second touch routing line is connected to the X-touch electrode line and the second touch pad.

2. The touch display device of claim 1, wherein at least a portion of the second part is located on an area surrounded by the at least one of the X-touch electrode line and the Y-touch electrode line that is electrically connected to the second part.

3. The touch display device of claim 1, wherein at least a portion of the second part is located on an area surrounded by a touch electrode line which is supplied a same signal as a signal supplied to the at least one of the X-touch electrode line and the Y-touch electrode line that is electrically connected to the second part and is insulated from the second part.

4. The touch display device of claim 1, wherein the second part is a line shape corresponding to an outer line of the at least one of the X-touch electrode line and the Y-touch electrode line that is electrically connected to the second part.

5. The touch display device of claim 3, wherein the second part comprises a same pattern as a pattern included in the touch electrode line electrically connected to the second part.

6. The touch display device of claim 1, wherein the second part is on a layer where the at least one of the X-touch electrode line and the Y-touch electrode line is disposed, and at least one insulating layer is between the second part and the encapsulation layer.

7. The touch display device of claim 1, wherein the X-touch electrode line, the Y-touch electrode line, the first touch routing line from the plurality of touch routing lines that is electrically connected to the X-touch electrode line on a first point, and the second touch routing line from the plurality of touch routing lines that is electrically connected to the Y-touch electrode line on a second point are disposed on a same layer on the active area.

8. The touch display device of claim 1, further comprising:
    an auxiliary routing line on a different layer from a layer where the second part is disposed, the auxiliary routing line on an area except for an area where the X-touch electrode line and the Y-touch electrode line cross, and the auxiliary routing line electrically connected to the second part.

9. The touch display device of claim 7, wherein both of the first point and the second point are located on the active area.

10. The touch display device of claim 7, wherein the first point is located on the active area, the second point is located on a boundary of the active area or on the non-active area.

11. The touch display device of claim 7, wherein a distance between the first point and the second point is less than a distance between both ends of a touch electrode line connected to two or more of the plurality of touch routing lines.

12. The touch display device of claim 1, wherein at least one of the X-touch electrode line and the Y-touch electrode line comprise:
    a first group comprising two or more touch electrodes electrically connected to each other, and a second group insulated from the first group and comprising two or more touch electrodes electrically connected to each other, and wherein each of the first group and the second group is electrically connected to two or more touch routing lines of the plurality of touch routing lines.

13. The touch display device of claim 12, wherein a portion of a touch routing line electrically connected to the first group is disposed on an area surrounded by the second group, and a portion of a touch routing line electrically connected to the second group is disposed on an area surrounded by the first group.

14. The touch display device of claim 12, wherein a portion of a touch routing line electrically connected to the first group is disposed on an area surrounded by the second group, and a touch routing line electrically connected to the second group is located outside an outer line of the first group.

15. The touch display device of claim 14, further comprising:

at least one shielding pattern between the portion of the touch routing line electrically connected to the first group and the second group, and insulated from the first group and the second group.

16. The touch display device of claim 15, wherein a constant voltage is supplied to the at least one shielding pattern, or a signal corresponding to a signal supplied to any one of the X-touch electrode line and the Y-touch electrode line is supplied to the at least one shielding pattern.

17. A touch display device, comprising:

a X-touch electrode line comprising a plurality of X-touch electrodes disposed on an active area on an encapsulation layer, at least some of the plurality of X-touch electrodes electrically connected to each other along a first direction;

a Y-touch electrode line comprising a plurality of Y-touch electrodes disposed on the active area on the encapsulation layer, at least some of the plurality of Y-touch electrodes electrically connected to each other along a second direction crossing the first direction;

a plurality of touch routing lines, at least a portion of a touch routing line from the plurality of touch routing lines is on the encapsulation layer, and each of the plurality of touch routing lines is electrically connected to one of the X-touch electrode line and the Y-touch electrode line; and a plurality of touch pads connected to the plurality of touch routing lines, wherein each of at least one of the X-touch electrode line and the Y-touch electrode line is electrically connected in common to two or more touch routing lines of the plurality of touch routing lines, and each of at least one of the two or more touch routing lines comprises a first part disposed on a non-active area located outside the active area and a second part connected to the first part, at least a portion of the second part is on the active area, and the second part is electrically connected to at least one of the X-touch electrode line and the Y-touch electrode line, wherein at least one of the X-touch electrode line and the Y-touch electrode line comprise:

a first group comprising two or more touch electrodes electrically connected to each other, and a second group insulated from the first group and comprising two or more touch electrodes electrically connected to each other, and wherein each of the first group and the second group is electrically connected to two or more touch routing lines of the plurality of touch routing lines, wherein the two or more touch routing lines includes a first touch routing line and a second routing line, and the plurality of touch pads includes a first touch pad and a second touch pad, wherein the first touch routing line is connected to the first group of the X-touch electrode line and the first touch pad, and the second touch routing line is connected to the first group of the X-touch electrode line and the second touch pad.

18. A touch display device comprising:

a X-touch electrode line comprising a plurality of X-touch electrodes disposed on an active area on an encapsulation layer, at least some of the plurality of X-touch electrodes electrically connected to each other along a first direction;

a Y-touch electrode line comprising a plurality of Y-touch electrodes disposed on the active area on the encapsulation layer, at least some of the plurality of Y-touch electrodes are electrically connected to each other along a second direction that crosses the first direction;

a plurality of touch routing lines, a portion of a touch routing line from the plurality of touch routing lines on the encapsulation layer, and each of the plurality of touch routing lines is electrically connected to one of the X-touch electrode line and the Y-touch electrode line;

an insulating layer on the X-touch electrode line and the Y-touch electrode line;

a color filter on the insulating layer; and an auxiliary routing line on a different layer from a layer where the second part is disposed, the auxiliary routing line on an area except for an area where the X-touch electrode line and the Y-touch electrode line cross, and the auxiliary routing line electrically connected to the second part, wherein each of at least one of the plurality of touch routing lines comprises a first part on a non-active area located outside the active area and a second part connected to the first part, at least a portion of the second part is on the active area, and the second part is electrically connected to one of the X-touch electrode line and the Y-touch electrode line.

* * * * *